United States Patent
Takayama et al.

(10) Patent No.: US 8,630,532 B2
(45) Date of Patent: Jan. 14, 2014

(54) VIDEO PROCESSING APPARATUS AND VIDEO PROCESSING METHOD

(75) Inventors: Shunsuke Takayama, Kanagawa (JP); Koji Yamamoto, Tokyo (JP); Hisashi Aoki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1084 days.

(21) Appl. No.: 12/382,827

(22) Filed: Mar. 24, 2009

(65) Prior Publication Data

US 2010/0054691 A1 Mar. 4, 2010

(30) Foreign Application Priority Data

Sep. 1, 2008 (JP) ................................ 2008-223666

(51) Int. Cl.
 *H04N 5/93* (2006.01)
(52) U.S. Cl.
 USPC .......................................................... 386/278
(58) Field of Classification Search
 USPC .......................................................... 386/278
 See application file for complete search history.

(56) References Cited

U.S. PATENT DOCUMENTS

| | | | |
|---|---|---|---|
| 6,144,366 A | 11/2000 | Numazaki et al. | |
| 6,219,382 B1 | 4/2001 | Kikuchi et al. | |
| 6,301,302 B1 | 10/2001 | Kikuchi et al. | |
| 6,459,735 B1 | 10/2002 | Suito et al. | |
| 6,580,437 B1 | 6/2003 | Liou et al. | |
| 6,636,271 B1 | 10/2003 | Megeid | |
| 7,020,336 B2 | 3/2006 | Cohen-Solai et al. | |
| 2003/0081836 A1 | 5/2003 | Averbuch et al. | |
| 2004/0125877 A1 | 7/2004 | Chang et al. | |
| 2005/0149557 A1 | 7/2005 | Moriya et al. | |
| 2005/0203927 A1 | 9/2005 | Sull et al. | |
| 2006/0045346 A1 | 3/2006 | Zhou | |
| 2006/0143650 A1* | 6/2006 | Tanikawa et al. | 725/38 |
| 2006/0159168 A1 | 7/2006 | Ahn et al. | |
| 2006/0263045 A1 | 11/2006 | Horiguchi | |
| 2006/0291729 A1 | 12/2006 | Wu et al. | |
| 2007/0201764 A1 | 8/2007 | Jung et al. | |
| 2007/0230781 A1* | 10/2007 | Yamamoto | 382/173 |
| 2008/0266319 A1* | 10/2008 | Momosaki et al. | 345/619 |
| 2010/0232765 A1 | 9/2010 | Suginohara et al. | |

FOREIGN PATENT DOCUMENTS

| | | |
|---|---|---|
| JP | 07-046582 | 2/1995 |
| JP | 10-154148 | 6/1998 |
| JP | 3024574 | 1/2000 |
| JP | 2000-165806 | 6/2000 |
| JP | 2001-285786 | 10/2001 |

(Continued)

OTHER PUBLICATIONS

Li, Yiqun et al.; "Video Clock Time Reconition Based on Temporal Periodic Pattern Change of the Digit Charcters"; Proceedings of IEEE ICASSP 2006; pp. 653-656.

(Continued)

*Primary Examiner* — Kambiz Zand
*Assistant Examiner* — Ali Shayanfar
(74) *Attorney, Agent, or Firm* — Nixon & Vanderhye, P.C.

(57) ABSTRACT

A video processing apparatus calculates displayed time of two input segments having a telop area in a video on the basis of a time displayed area, determines whether or not the two input segments are a series of scene segments on the basis of the two displayed times, and outputs the two input segments determined as the series of scene segments as an output segment.

14 Claims, 24 Drawing Sheets

(56) References Cited

FOREIGN PATENT DOCUMENTS

| | | |
|---|---|---|
| JP | 2005-509962 | 4/2005 |
| JP | 2006-324770 | 11/2006 |
| JP | 2007-102264 | 4/2007 |
| JP | 2007-274154 | 10/2007 |
| JP | 2008-072232 | 3/2008 |
| WO | 2007/073349 | 6/2007 |

OTHER PUBLICATIONS

Bu, Fan et al.; "Detect and Recognize Clock Time in Sports Video"; Proceedings of the 9$^{th}$ Pacific Rim Conference on Multimedia (2008); pp. 306-316.

Yamamoto, U.S. Appl. No. 11/533,972, filed Sep. 21, 2006.

Momosaki et al., U.S. Appl. No. 12/076,059, filed Mar. 13, 2008.

* cited by examiner

```
┌┄┄┄┄┄┐
┊     ┊  PROVISIONAL TELOP AREA
└┄┄┄┄┄┘

▨▨▨▨   AREAS INCLUDED IN PROVISIONAL TELOP AREA
```

DIVIDE RESPECTIVE PIXELS INTO PARTIAL AREAS

DIVIDE SET OF ADJACENT PIXELS AS PARTIAL AREAS

DETECTION CYCLE : C
SAMPLING CYCLE : C/3
CHANGED : 1 : NO CHANGE : 0

⟶ CYCLICAL CHANGE
----▶ NON CYCLICAL CHANGE

● RATIO OF CHANGE : HIGH
⌐ ⌐ ⌐ DETECTED PROVISIONAL TELOPS

TELOP AREA

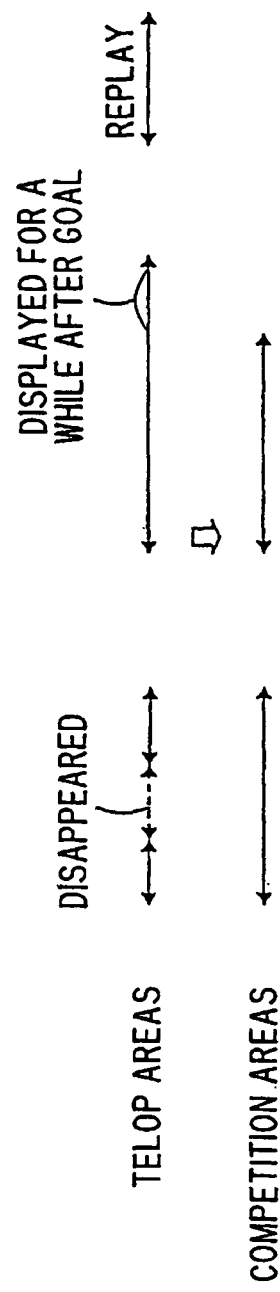

VIDEO PROCESSING APPARATUS AND VIDEO PROCESSING METHOD

CROSS-REFERENCE TO RELATED APPLICATION

This application is based upon and claims the benefit of priority from the prior Japanese Patent Application No. 2008-223666, filed on Sep. 1, 2008; the entire contents of which are incorporated herein by reference.

FIELD OF THE INVENTION

The present invention relates to a video processing apparatus configured to divide video including telops into scenes and a method of the same.

DESCRIPTION OF THE BACKGROUND

In recent years, a number of video contents are in circulation by multi-channeled broadcasting or the like, or development information infrastructure. On the other hand, the video contents are able to be stored as digital data for image processing by the spread of recording apparatus such as a hard disk recorder or a tuner-mounted personal computer, so that users are able to watch the video efficiently.

As one of the image processing as described above, there is a function to divide one video content into semantic scenes and to jump the starting points of the scenes. The starting points of these scenes are referred also to as chapter points, and a video recording device is able to detect and set automatically the chapter points, or the user is able to set the chapter points at arbitrary positions.

As a method of dividing a video into scenes, there is a method of dividing into scenes at points where the camera is switched as boundaries. In JP-A-2008-72232 (KOKAI), for the sport video, a time telop which indicates the elapsed time or remaining time of the match is detected and the positions switching of the camera during a segment where the competition time telop is displayed are not considered as the scene boundaries, so that excessive division of the scenes is restrained.

In some sport videos, the telop indicating the elapsed time or the remaining time of the game is displayed. The sport video may be divided into the play scenes and other scenes by detecting the appearance of the telop.

However, in the sport video, the segments where the competition time telop is displayed and the competition scenes do not always match. For example, in the sport video, there is a case in which the competition time telop is disappeared even though the competition is going on, or in which it is continuously displayed for a while after having finished the competition. Therefore, there is a problem such that the video processing apparatus in the related art cannot divide the scenes correctly.

SUMMARY OF THE INVENTION

In order to solve the problem described above, it is an object of the invention to provide a video processing apparatus which is able to divide a video into scenes which the user wants to watch, and a method of the same.

According to an embodiment of the invention, there is provided a video processing apparatus including: a video input unit configured to input a video including a plurality of frames; a display detection unit configured to detect telop areas including a cyclically changing area which changes cyclically at arbitrary intervals in respective frame segments in the video and detect a time display area from the telop areas; a segment selecting unit configured to set a plurality of frame segments having the telop areas respectively as input segments and select arbitrary two of the input segments from the plurality of input segments; a displayed time calculating unit configured to calculate respective displayed times of the two input segments on the basis of the time display areas in the two input segments; and a scene data calculating unit configured to determine whether or not the two input segments are a series of scene segments on the basis of the displayed times of the two input segments and output the two input segments determined to be the series of scene segments as an output segment which is a scene segment including the two input segments combined to each other.

According to the invention, the video such as sport may be divided into scenes that users want to watch.

BRIEF DESCRIPTION OF THE DRAWINGS

FIG. 26 is a drawing showing the relation of the telop area and a real competition scene.

DETAILED DESCRIPTION OF THE INVENTION

Referring now to FIGS. 1 to 27, a video processing apparatus according to an embodiment of the invention will be described.

The term "video" means a dynamic picture image having a plurality of frames.

The term "frame segment" means videos including a plurality of frames specified by a frame start time and a frame end time. The terms "frame start time" and "frame end time" mean times in a frame time having time series corresponding to a flow of video. In the same manner, among the videos including the plurality of frames specified by the frame start time and the frame end time, those included in an output segment outputted by a scene data calculating unit 103, described later, are referred to as "scene segments" in the embodiment.

The term "telop" is not limited to characters, but indicates characters or images combined on a screen. Only images which do not include characters such as logos are also referred to as the telop.

The term "displayed time" means numeric characters displayed in videos as telops being recognized as time.

(1) Configuration of Image Processing Apparatus

Figure 1:
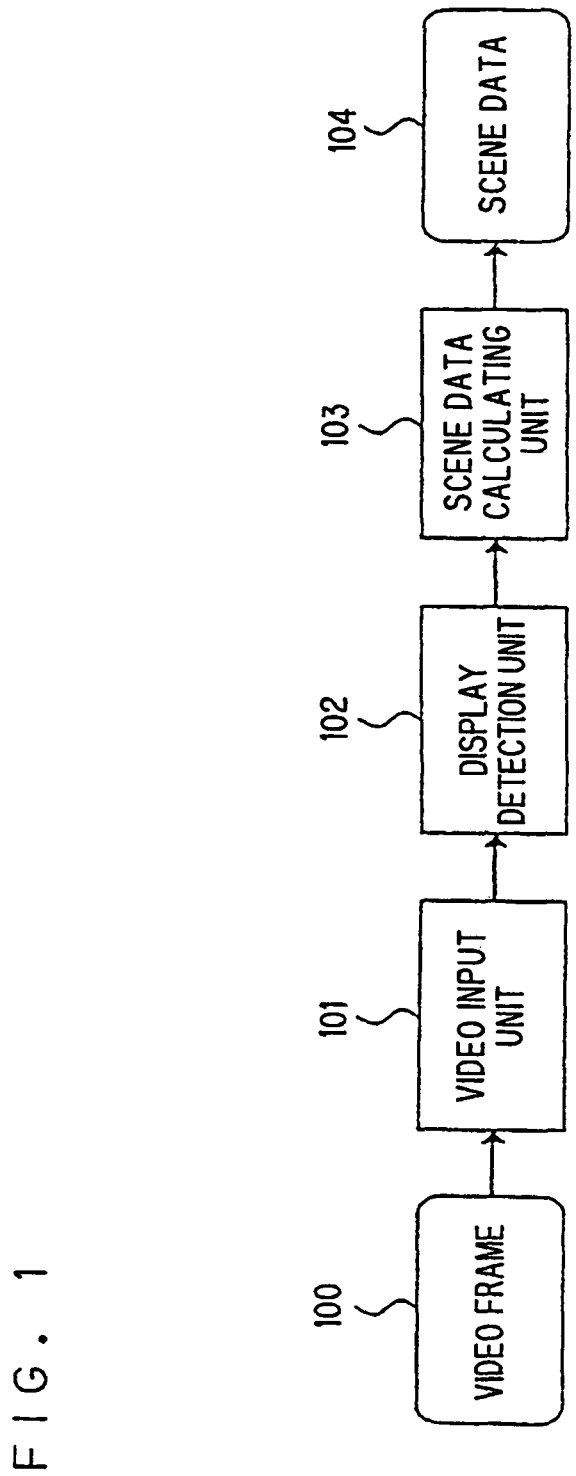
FIG. 1 is a block diagram of a video processing apparatus according to an embodiment of the invention.

As shown in FIG. 1, the video processing apparatus in the embodiment includes a video input unit 101, a display detection unit 102, and the scene data calculating unit 103.

The video input unit 101 inputs a video including a plurality of video frames 100.

The display detection unit 102 detects telop areas including a time display area from the video frames. Detailed description of the display detection unit 102 will be given later referring to FIGS. 2 to 9.

The scene data calculating unit 103 calculates scene data on the basis of the frame segments in which the detected telop areas are displayed. Detailed description of the scene data calculating unit 103 will be given later referring to FIGS. 11 to 26.

(2) Video Input Unit 101

The video input unit 101 will be described first.

The video input unit 101 reads a single video frame 100 into a memory. At this time, if any video frames 100 read in the past are already accumulated in the memory, the video input unit 101 accumulates the video frame 100 in the order of the frame time. This process is repeated until all the video frames 100 are read, or a predetermined number of frames are accumulated. When the process is completed, the video input unit 101 outputs as video frames 200 to the display detection unit 102.

(3) Configuration of Display Detection Unit 102

Figure 2:
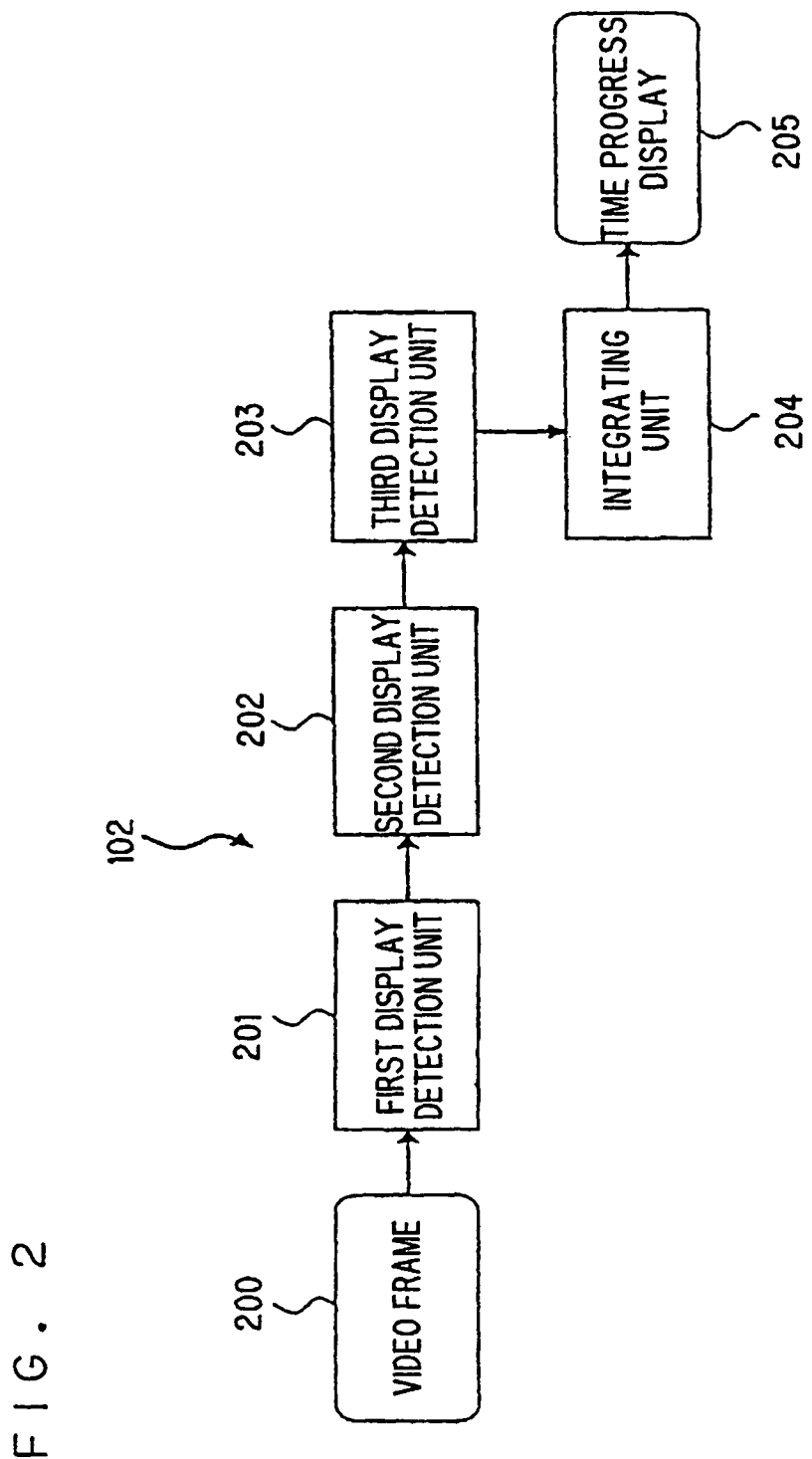
FIG. 2 is a block diagram of a display detection unit.

Referring now to FIG. 2, the display detection unit 102 will be described.

There are various methods of detecting the telop areas from a video, and an example is shown here. FIG. 2 is a block diagram showing the detailed configuration of the display detection unit 102.

The display detection unit 102 includes a first display detection unit 201, a second display detection unit 202, a third display detection unit 203, and an integrating unit 204.

Figure 3:
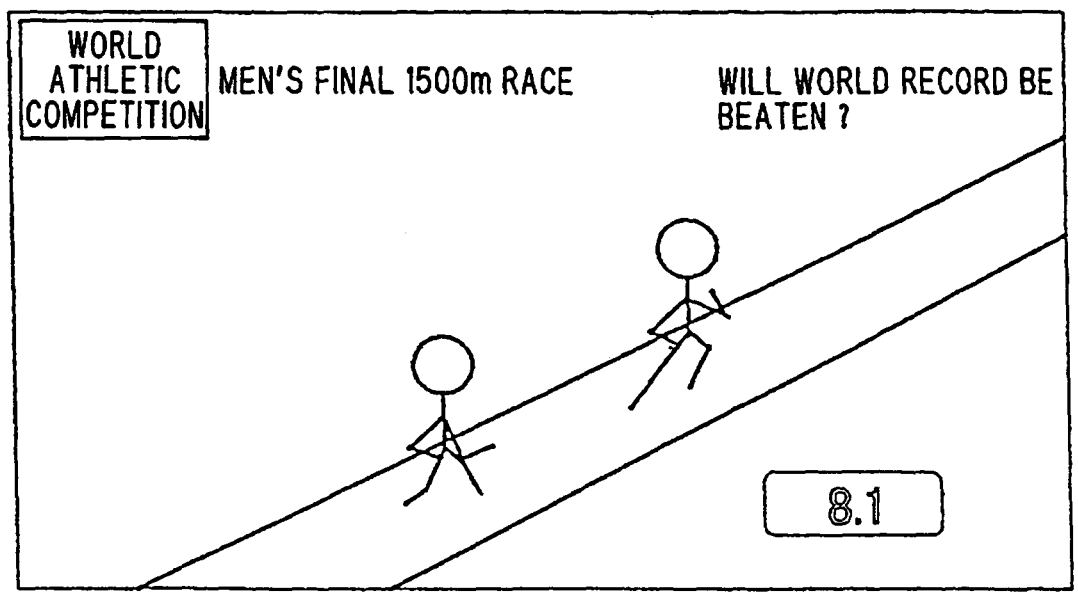
FIG. 3 is a drawing showing an example of a competition time telop displayed in a video.

The telop areas such as competition time telops of sport videos has a characteristic such that the time display area changes cyclically. In the video, various telops appear as shown in FIG. 3. The competition time telops include telop characters displayed with a peripheral area which does not change like the telop shown on the lower right in FIG. 3 in quite many cases. Therefore, provisional telop areas are detected first, and then time display areas including a cyclically changing area which changes cyclically in the interiors of the provisional telop areas are detected as the telop areas of the competition time telops. In the example shown in FIG. 5C, a portion of the numeric characters "8.1" corresponds to the time display area, and an area surrounded by an outer frame including the portion of the numeric characters corresponds to the telop area.

The first display detection unit 201 detects areas which do not change over several frames by the number equal to or larger than a threshold value as the provisional telop areas from the accumulated video frames 200 as input data. These provisional telop areas are certain closed areas, and hence there may be changing areas outside the closed areas. In other words, the changing areas within the closed areas are not no-change areas.

The second display detection unit 202 divides an area included in the provisional telop area into partial areas, and detects the presence or absence of the change in the respective partial areas between adjacent frames sampled at regular intervals.

The third display detection unit 203 detects partial areas which cyclically change as cyclically changing areas at predetermined interval.

The integrating unit 204 integrates a set of cyclically changing areas at adjacent positions, and detects the provisional telop area including the cyclically changing area as a telop area including the time display area.

(4) Operation of Display Detection Unit 102

Figure 4:
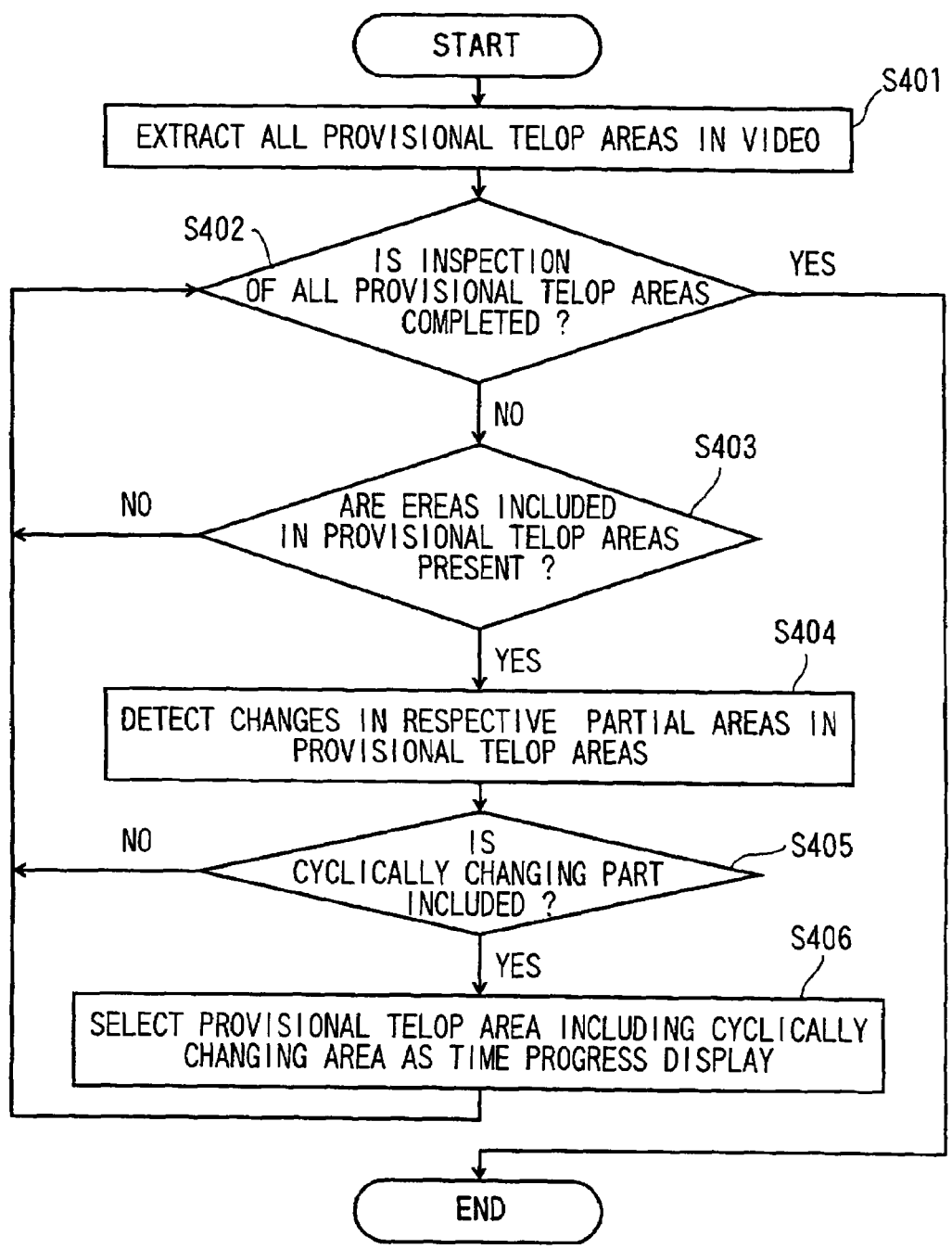
FIG. 4 is a flowchart showing an example of operation of the video processing apparatus.

Referring now to FIG. 4, the operation the display detection unit 102 will be described.

(4-1) Step S401

First of all, in Step S401, the first display detection unit 201 extracts all areas which do not change for a long time over a plurality of video frames 200 included in an entered video as the provisional telop areas. The first display detection unit 201 stores the position of appearance, the size, and the segment of appearance for each of the detected provisional telop areas. The provisional telop areas are detectable by using a telop detection technology used in the related art. As an example of the method of detecting the provisional telop areas, there is a method disclosed in JP-A-2007-274154.

(4-2) Step S402

Subsequently, in Step S402, the respective members 201, 202, 203, and 204 carry out the process from Step S403 onward for all the detected provisional telop areas.

(4-3) Step S403

Subsequently, in Step S403, the first display detection unit 201 inspects whether areas included in the detected provisional telop areas are present or not and, if yes, the procedure goes to Step S404 and, if not, the inspection of the provisional telop areas is ended and the procedure goes back to Step S402.

(4-4) Step S404

Subsequently, in Step S404, the second display detection unit 202 divides the area included in the detected provisional telop area into respective partial areas, and detects the presence or absence of the change in the respective partial areas between adjacent frames sampled at regular intervals.

In other words, the second display detection unit 202 divides an area inside the outer edge of the provisional telop area into the partial areas. The area inside the outer edge of the provisional telop area may include a no-change portion in some cases. For example, in the example shown in FIG. 5B described later, two solid oval areas included in the provisional telop area on the lower right are changing areas. Consequently, the presence or absence of the change in the each partial area is outputted for each of the adjacent frame pairs within the segment in which the provisional telop area is displayed. Detailed description of the second display detection unit 202 will be given later referring to FIGS. 6A and 6B.

Figure 5A:
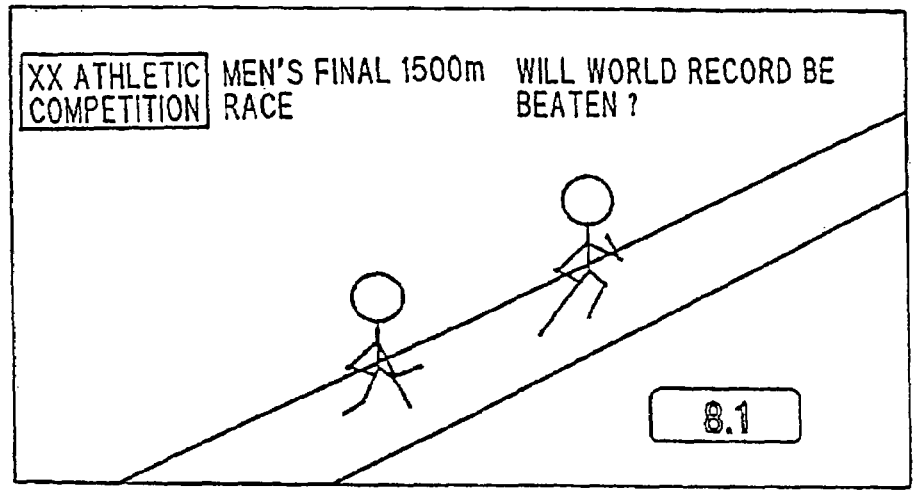
FIGS. 5A, 5B, and 5C are drawings showing examples of provisional telop areas extracted from the video and examples showing areas included in the provisional telop area.
Figure 5B:
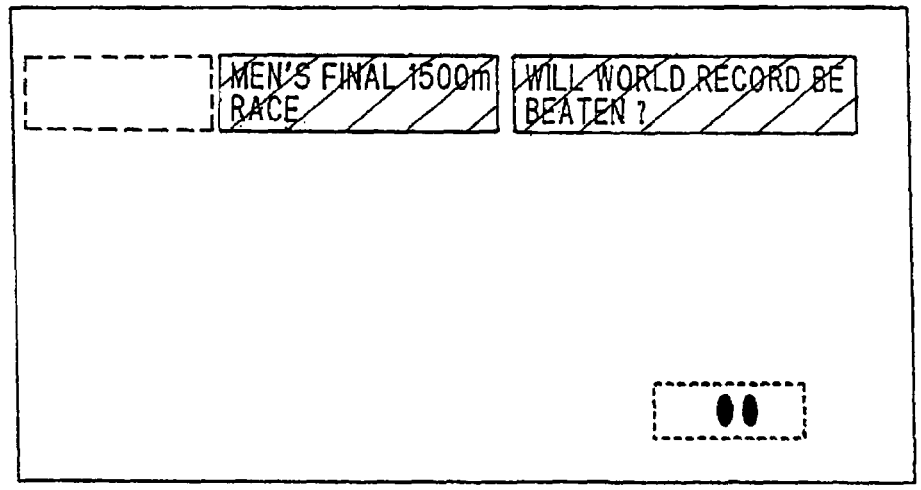
Figure 5C:
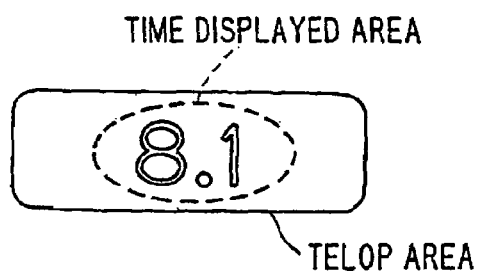

The smallest rectangular including the no-change area detected as shown in FIGS. 5A, 5B, and 5C is detected, and areas included in this rectangular are determined as areas included in the provisional telop areas. It is also possible to determine only the areas surrounded by the no-change area as areas included in the provisional telop areas.

There may be a case in which the time display area is protruded from the provisional telop area. Therefore, detection of the cyclically changing area may be carried out not only on the interiors of the provisional telop areas, but also on the peripheral area as a target of detection.

(4-5) Step S405

In Step s405, the third display detection unit 203 detects partial areas which cyclically change as cyclically changing areas at predetermined interval in the areas included in the provisional telop area.

The third display detection unit 203 inspects all the partial areas and, if the cyclically changing area is detected, the procedure goes to Step S406 and, if the cyclically changing area is not detected at all, the inspection of the corresponding provisional telop area is ended, and the procedure goes to Step S402. Detailed description of the third display detection unit 203 will be given later referring to FIG. 7.

(4-6) Step S406

Finally, in Step S406, the integrating unit 204 integrates a set of cyclically changing areas at adjacent positions, and detects the provisional telop area including the cyclically changing area as a telop area including the time display area.

The detected telop area is outputted to the scene data calculating unit 103.

Then, the integrating unit 204 ends the inspection of the telop area and the procedure goes back to Step S402. Detailed description of the integrating unit 204 will be given later.

(5) Detail of Step S404

Figure 6A:
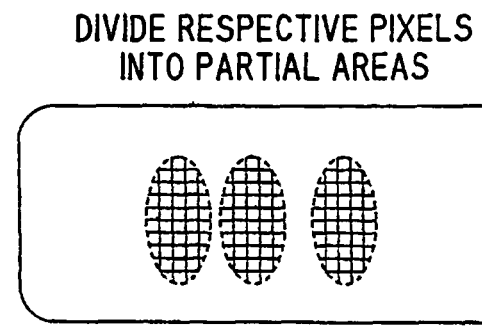
FIG. 6A is a drawing showing an example in which areas included in the provisional telop areas are divided into each pixel as partial areas.
Figure 6B:
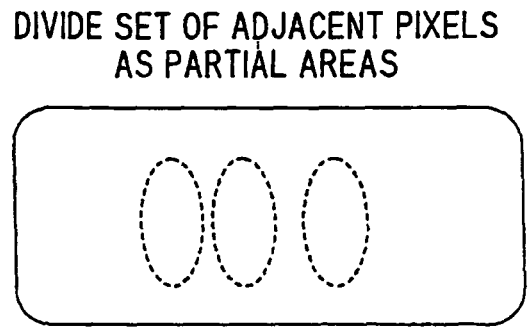
FIG. 6B is a drawing showing an example in which the areas included in the provisional telop areas are divided into sets of adjacent pixels as partial areas.

Referring now to FIGS. 6A and 6B, a method of detecting the area change in Step S404 will be described. There are various methods of determining the presence or absence of the change of the image by the second display detection unit 202, and an example is shown here.

The operation of the second display detection unit 202 includes a step of dividing an area included in the provisional telop area into partial areas, and a step of detecting the presence or absence of the change in the respective partial areas between adjacent frames sampled at regular intervals.

(5-1) First Method of Detecting Area Change

A first method of detecting the area change is, as shown in FIG. 6A, considering respective pixels as partial areas, and determining the presence or absence of the change in the respective pixels between adjacent frames.

Determination of the presence or absence of the area change is achieved by recognizing that it is changed when the relation d>threshold value is satisfied, where d is the distance (similarity) between target pixels in the adjacent frames. As the distance (similarity), the distance (similarity) of the characteristic amounts such as the color or luminance of the pixels, numerical values binarized with the luminance as the threshold value are used. The color distance includes Euclidean distance such as RGB value or HSV value. The letter H indicates hue, S indicates saturation, and V indicates luminance. As another method, the target pixel may be recognized as having changed when the average of the distances of N pixels including the peripheral pixels of the target pixels $d=\Sigma d/N$ is obtained and the obtained average satisfies the "averaged d>threshold value". The value of N is to be determined in advance.

(5-2) Second Method of Detecting Area Change

A second method of detecting the area change is a method of detecting the presence or absence of the change taking the set of adjacent pixels as one partial area as shown in FIG. 6B.

As the method of determining the presence or absence of the change, when "r>threshold value" is satisfied where r is the ratio of the pixels changed in the partial area, it is recognized that the partial area is changed. Detection of the presence or absence of the change of the respective pixels may be achieved by the above-described first method of detecting the area change. It is also applicable to compare the entire areas using the colors of the respective areas and the color histogram.

(5-3) Third Method of Detecting Area Change

A third method of detecting the area change is a method of detecting the area change using an edge image. This utilizes a feature such that the telop area is displayed in high luminance in many cases. First of all, the respective frames are binarized by the luminance value. Among the pixels having the pixel value of 1 (high-luminance), when all the four pixels on the upper, lower, left and right sides of the target pixel are 1, the pixel value of the target pixel is changed to zero. Using the edge image obtained in this manner is used for detecting the area change with the first and second methods of detecting the area change as described above.

(6) Detail of Step S405

Figure 7:
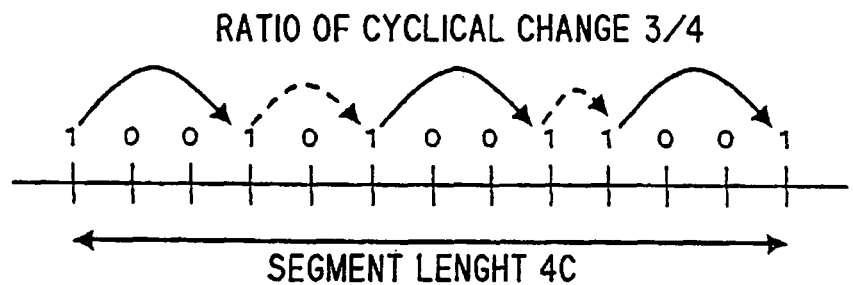
FIG. 7 is a drawing showing an example of a method of detecting a cyclically changing area.

Referring now to FIG. 7, a method of detecting the cyclically changing area in Step S405 will be described. There are various methods of detecting the periodicity by the third display detection unit 203, and an example is shown here.

(6-1) First Method

A first method will be described.

The third display detection unit 203 detects partial areas which cyclically change at predetermined interval as cyclically changing areas.

The third display detection unit 203 determines a cycle C of an area which is wanted to be detected.

Then, the third display detection unit 203 detects an area which changes at the cycle C.

Then, the third display detection unit 203 samples at the cycle C.

Then, the third display detection unit 203 detects the partial area whose ratio of change in with respect to time is equal to or higher than the threshold value as the partial area which changes at the cycle C in frame segments in which the provisional telop area including the respective partial areas is displayed. The ratio of change in with respect to time is obtained from the ratio of the number of times of change in the respective partial areas with respect to the total appearance time of the provisional telop area.

(6-2) Second Method

A second method of detecting the area changing at the cycle C will be described.

The second method is a method of sampling in a cycle C/N, which is shorter cycle than C, where N is an integer. When the interval from the change of the partial area of the corresponding portion last time to the next change is C, it is recognized that is it cyclically changed, and the partial area whose ratio of cyclical change is equal to or larger than the threshold value is detected as the cyclically changing area which changes at the cycle C.

FIG. 7 shows an example. In this example, since three times of cyclical changes are observed in the segment length 4C, where the detection cycle is C, the ratio of cyclical change becomes 3/4.

(6-3) Third Method

A third method is a method in a case in which the cycle of the area in which the detection is wanted to be carried out is not determined in advance.

The third method is able to obtain the presence or absence of the cyclical changes in the respective partial areas and the cycles thereof by analyzing the frequency with the data indicating the presence or absence of the change in the direction of time as input data.

For example, when discrete Fourier transform is carried out and, when the maximum spectrum therein is equal to or larger than the predetermined threshold value, the cyclically changing area is outputted as having the cycle of the corresponding spectrum.

(7) Detail of Step S406

Finally, a method of detecting the telop area by the integrating unit 204 in Step S406 will be described.

The integrating unit 204 integrates the set of cyclically changing areas in the same cycle at adjacent positions, and detects the provisional telop area including the cyclically changing area as a telop area including the time display area.

(7-1) First Method

First of all, a first method in which the respective pixels are considered to be a partial area in the second display detection unit 202 will be described.

As regards the detected each cyclically changing pixel, when the ratio of the cyclically changing pixels in an area within the distance d from the corresponding pixel is equal to or higher than the threshold value, the second display detection unit 202 integrates the area as a cyclically changing area. Then, the second display detection unit 202 detects the provisional telop area including the cyclically changing area as a telop area.

(7-2) Second Method

A second method in which respective sets of adjacent pixels are considered as a partial area in the second display detection unit 202 will be described.

The second display detection unit 202 obtains the number of pixels in the respective cyclically changing areas, or the total number of pixels n including the cyclically changing areas in a short distance, and considers areas of n>threshold value as a telop area.

(7-3) Third Method

Figure 8:
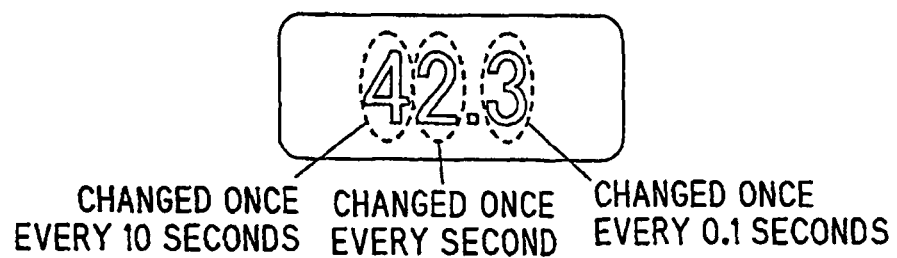
FIG. 8 is a drawing showing the configuration of the cyclically changing area in the telop area.

The integrating unit 204 may integrate the cyclically changing areas having different cycles located in the proximity as one cyclically changing area as a third method. The time display area includes a plurality of areas having different cycles in many cases as shown in FIG. 8. Therefore, there is also a method of integrating areas having respective cycles detected using the first or second methods described above as one cyclically changing area.

With this integration, simplification of the post process or improvement in accuracy of detection of the telop area is achieved. For example, when an area which changes in a cycle of 0.1 seconds is present to immediate right of an area which changes at a cycle of one second, and an area which changes in a cycle of 10 seconds is present to immediate left of the same, it is highly probably a telop area. In contrast, when there is no area which changes cyclically in the periphery thereof, a process of deleting as a trash may be carried out.

(8) Process for Improving Accuracy of Detection of Telop Area

The telop area has such feature as being displayed at the same position in an image frame throughout a program in many cases. Therefore, the following process may be carried out in order to improve the accuracy of detection of the telop area.

First of all, a plurality of detected provisional telop areas are classified into several groups on the basis of the display position, the size, and the color data in the image frame. The classification is achieved by obtaining a portion where the positions of display of the two provisional telop areas overlap and, when the ratios of the overlapped portion with respect to the respective provisional telop areas are equal to or higher than the threshold value, these areas are combined as the same group. It is also applicable to calculate the similarity of the provisional telop areas with respect to each other using the color histogram.

Subsequently, the groups of the provisional telop areas having a low frequency of appearance are deleted. The reference of groups to be deleted may be, for example, groups having three or less provisional telop areas, or may be groups determined by obtaining the total time of appearance for each group and selecting those having a total time of appearance smaller than a value obtained by multiplying the total time of the program by a certain ratio.

The time in the time display area does not necessarily change constantly. For example, in the case of Judo matches or American football matches, the competition is interrupted frequently, and the progression of time count is stopped during the interruption.

In the case of the frame segment in which the time count is almost stopped while the competition time telops are displayed, detection cannot be achieved successfully with the method of detecting the cyclical change for each of the detected telops.

Therefore, by grouping the telops displayed many times in the same program and detecting the average cyclical change, correct detection is achieved even when the frame segments in which the time count is stopped are present at some points.

(9) Detailed Example of Method of Detecting Telop Area

Referring now to FIGS. 9A to 9D, a detailed example of the method of detecting by the display detection unit 102 will be described.

Figure 9A:
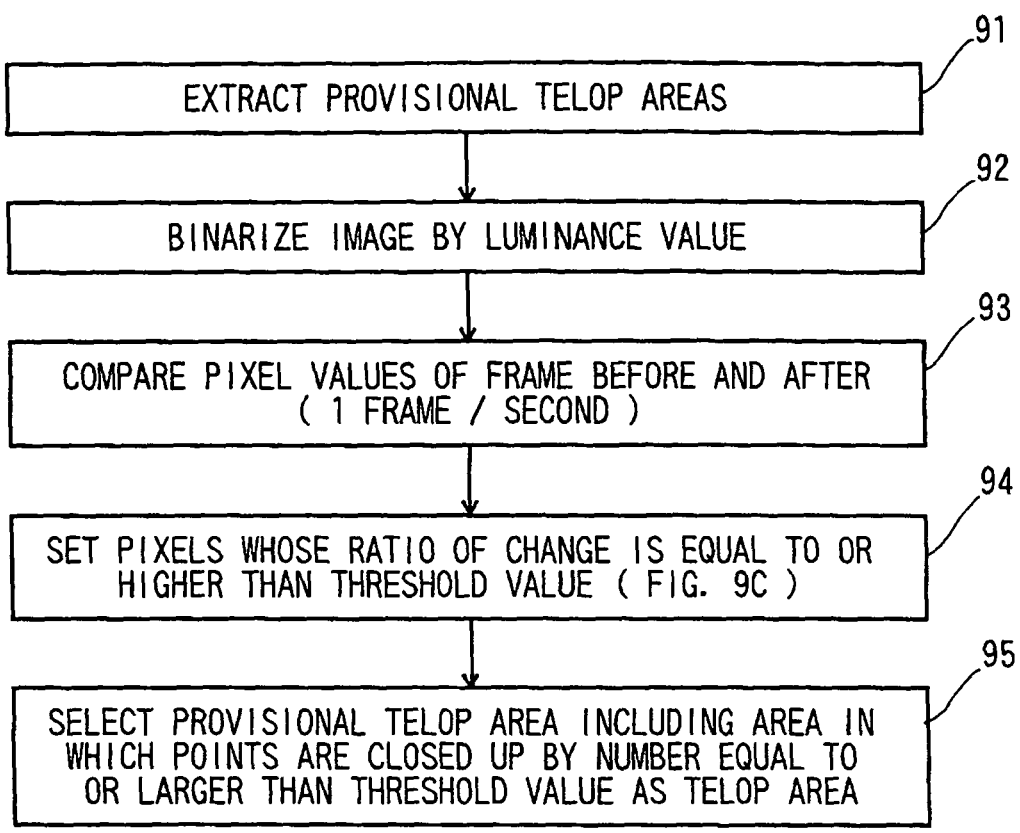
FIGS. 9A, 9B, 9C, and 9D are drawings showing examples of the operation of the display detecting unit.
Figure 9B:
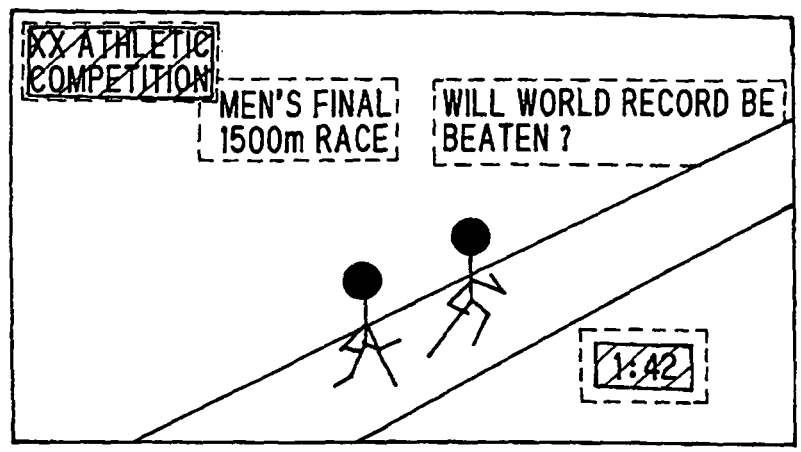

First of all, the display detection unit 102 uses a telop extraction technology used in the related art and obtains provisional telop areas in a video and the segments where the provisional telop areas are displayed (Step S91 in FIG. 9A, FIG. 9B).

Subsequently, the display detection unit 102 binarizes image by the luminance value (Step S92 in FIG. 9A).

Subsequently, the display detection unit 102 inspects the change in pixel values between front and after frames sampled at one second cycle (Step S93 in FIG. 9A). When binarizing the luminance value, the value is set to one when luminance value>150 is satisfied, and to zero in other cases.

Figure 9C:
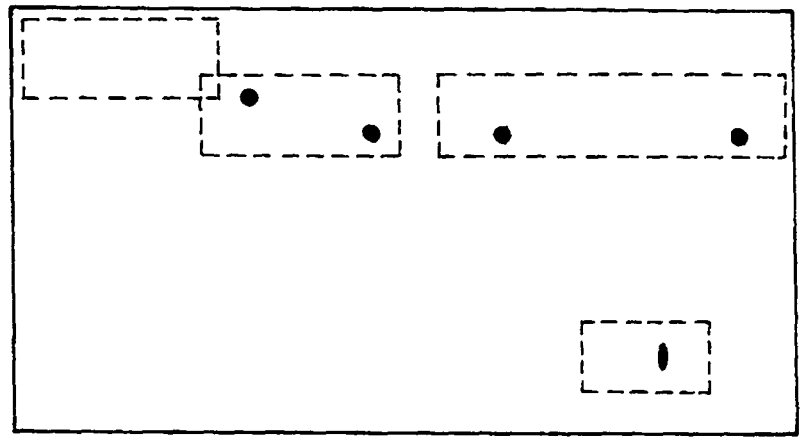

Subsequently, the display detection unit 102 detects pixels whose ratio of change within the scene segment is equal to or larger than the threshold value when the provisional telop areas are displayed as cyclically changing pixels (Step S91 in FIG. 9A, FIG. 9C).

Figure 9D:
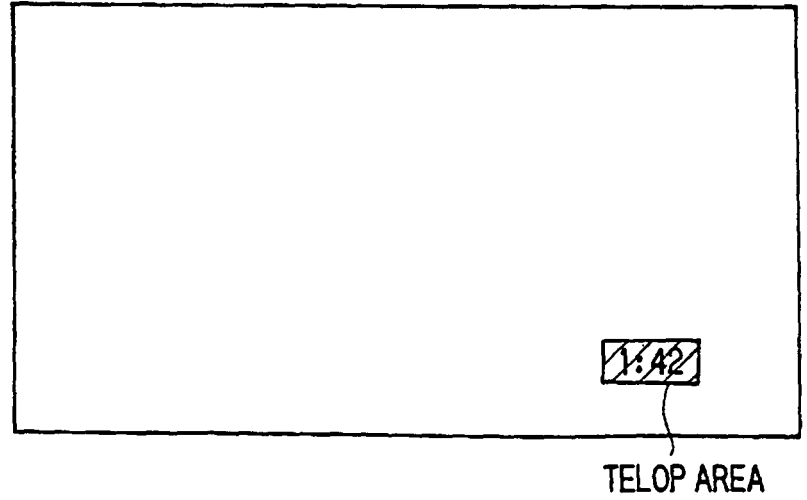

Finally, the display detection unit 102 detects a provisional telop area which includes an area in which the cyclically changing pixels are closed up as a telop area (Step S94 in FIG. 9A, FIG. 9D). Determination of the telop area depends on the resolution. When the resolution is 360×240, if 10 or more pixels of cyclically changing pixels are present in the area of 5×5, the provisional telop area including the corresponding area is determined as the telop area.

In this case, the threshold value of the ratio of change in the direction of time is 0.3. The ratio of change in the direction of time is represented by the ratio of the change present in a certain frame segment. For example, if there are three times of changes in ten frames, it is represented by 0.3. However, if the threshold value is high, the number of undetected telop areas increase, and if the threshold value is low, erroneous detection of areas other than the telop area increases, so that is effective to define the value experimentally.

(10) Modification of Display Detection Unit 102

The display detection unit 102 does not have to have the configuration as shown in FIG. 2.

For example, a method as disclosed in JP-A-2008-72232 may be employed.

There is also a method of detecting the provisional telop areas, recognizing telops in the interior areas thereof, and, if the telops include only a numeric character and reference sign, determining the corresponding area as the telop area. The telop recognition is achieved using a telop recognition technology used in the related art. For example, there is a method disclosed in JP-A-2007-102264.

(11) Scene Data Calculating Unit 103

The scene data calculating unit 103 will be described.

The scene data calculating unit 103 outputs a competition scene on the basis of the frame segments in which the telop area is displayed. For example, there is a method of outputting the frame segments in which the telop area is displayed in itself as the competition scene.

However, the frame segment in which the telop area is displayed and the competition scene do not always match. As shown in an example in FIG. 26, there is a case in which the telop area is disappeared en route even though the competition is going on, or in which it is continuously displayed for a while after having finished the competition. The scene data calculating unit 103 detects such scenes and estimates real competition scenes.

Figure 10:
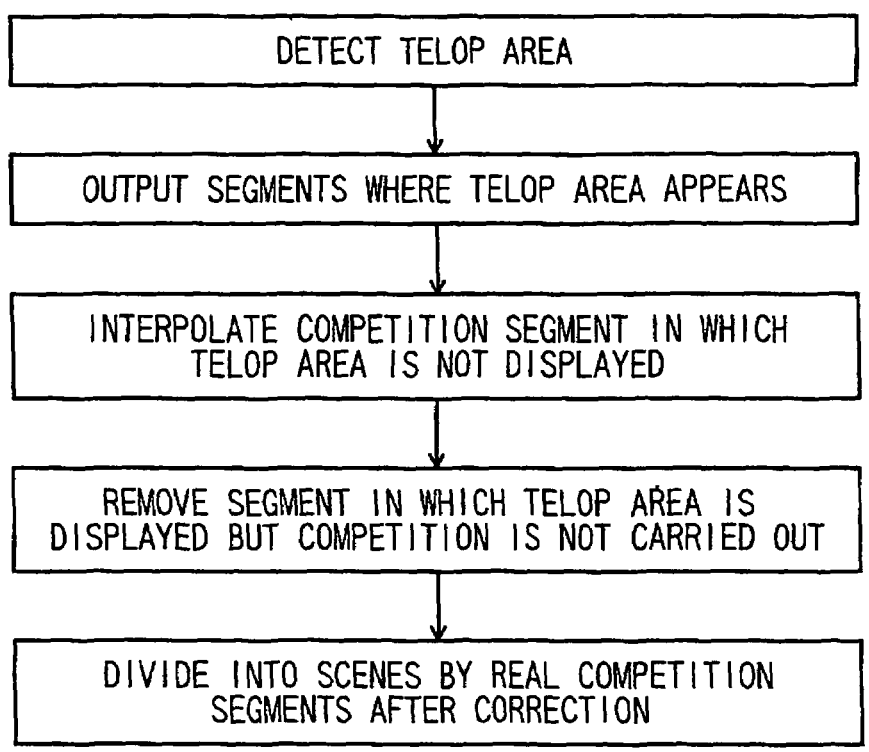
FIG. 10 is a flowchart showing a flow of the operation of a scene data calculating unit.

FIG. 10 roughly shows a flow of calculation of the competition scenes in the embodiment.

Although the telop areas include a display of the current time on the air, it is deleted since it is not necessary for estimation of the competition scenes. Since the current time display is changed in minutes, for example, a process to exclude the telop areas having a cycle of 5 seconds or more may be carried out.

From the detected telop areas, the scene data calculating unit 103 calculates the competition scene data only on the groups of the telop area whose number of times of appearance is equal to or larger than a threshold value and on the groups of the telop areas whose total appearance time in seconds is equal to or longer than a threshold value.

Figure 11:
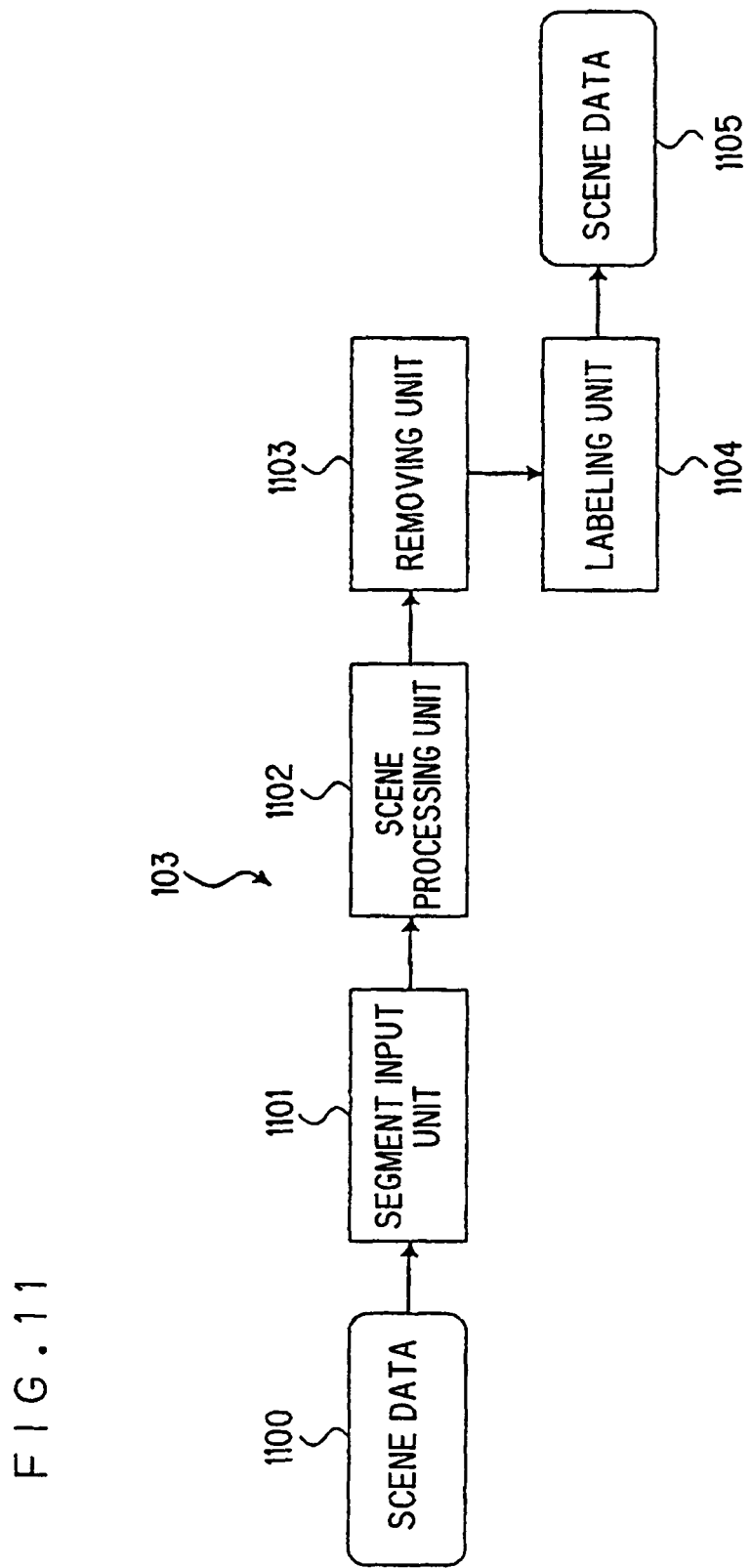
FIG. 11 is a block diagram of the scene data calculating unit in FIG. 1.

Referring now to FIG. 11, the scene data calculating unit 103 will be described. FIG. 11 is a block diagram showing the detailed configuration of the scene data calculating unit 103.

The scene data calculating unit 103 includes a segment input unit 1101, a scene processing unit 1102, a removing unit 1103, and a labeling unit 1104.

The respective members 1101 to 1104 of the scene data calculating unit 103 process the plurality of scene segments as input data, and the plurality of scene segments after having been processed are outputted. In the description given below, the state of the entered segments before processing are referred to as "input segments", and the state of the same after having processed and outputted is referred to as "output segments" for simplicity. Therefore, an output segment outputted from a certain processing unit might be entered as an input segment to a different processing unit. In the example shown in FIG. 26, the time progress display sections shown on the upper row represent the input segments, and the competition scenes shown on the lower row represent the output segments.

The segment input unit 1101 outputs the plurality of frame segments in which the telop area obtained by the display detection unit 102 is displayed to the scene processing unit 1102 as the input segments.

The scene processing unit 1102 selects arbitrary two input segments. The scene processing unit 1102 determines whether or not the two input segments are a series of scene segments on the basis of the displayed time in the time display areas included in the frames in the respective input segments. The scene processing unit 1102 interpolates and combines the two input segments determined as a series of scene segments and outputs the scene segment after having processed as the output segment.

The removing unit 1103 removes frame segments which satisfy predetermined conditions in the input segment as the frame segments different from the specific frame segment, and sets the remaining frame segments as the output segments, and outputs the same.

The labeling unit 1104 detects still segments in the time display area from the outputted output segments and labels the respective still segments as an important segment or an interrupted segment.

The block diagram in FIG. 11 is illustrative only, and all the processing units 1101 to 1104 of the scene data calculating unit 103 are not necessarily essential, and may be included partly or in the different order.

Although the scene processing unit 1102 and the removing unit 1103 are described to process or remove the scenes in the frame segment, these units may not process or remove the scenes, and only label the same. Whether or not to process or remove the scenes actually may be selected according to the application or the circumstances. For example, when the duration of the segment in which the telop area is displayed is 8 minutes and production of a digest video having a duration of 8 minutes is wanted, the segment in which the time display area is displayed may be used as is. When the production of a digest video having a duration of 5 minutes is wanted, there is a method of usage such as removing the input segments determined as the unnecessary segments by the removing unit 1103 in the segments in which the telop area is displayed, and produces a digest video from the remaining input segments.

(12) Scene Processing Unit 1102

Figure 12:
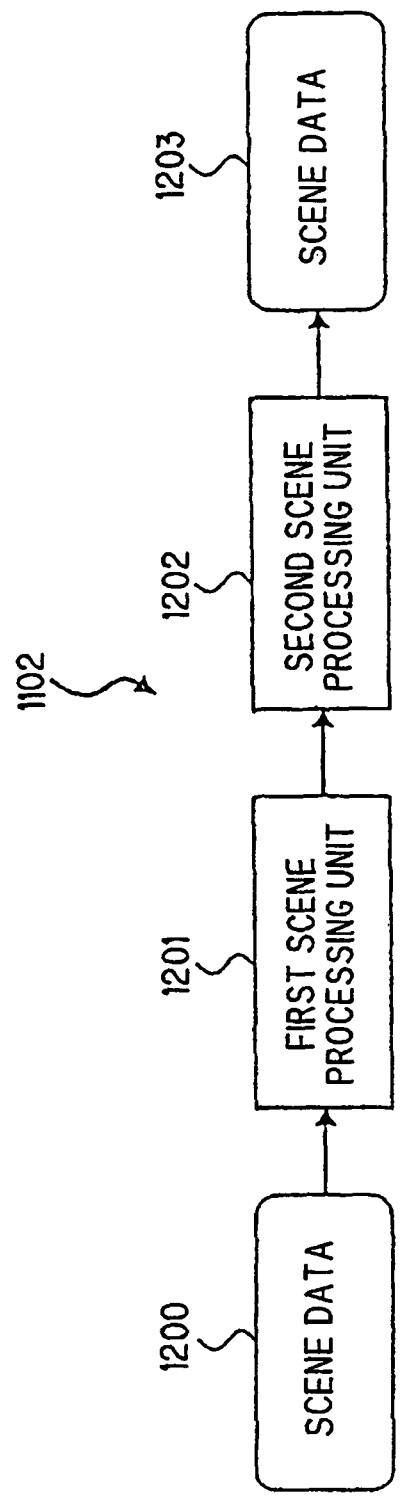
FIG. 12 is a block diagram showing a scene processing unit in FIG. 11.

Referring now to FIG. 12, the scene processing unit 1102 in FIG. 11 will be described. FIG. 12 is a block diagram showing the detailed configuration of the scene processing unit 1102.

(12-1) Object

An object of the scene processing unit 1102 will be described.

Figure 14:
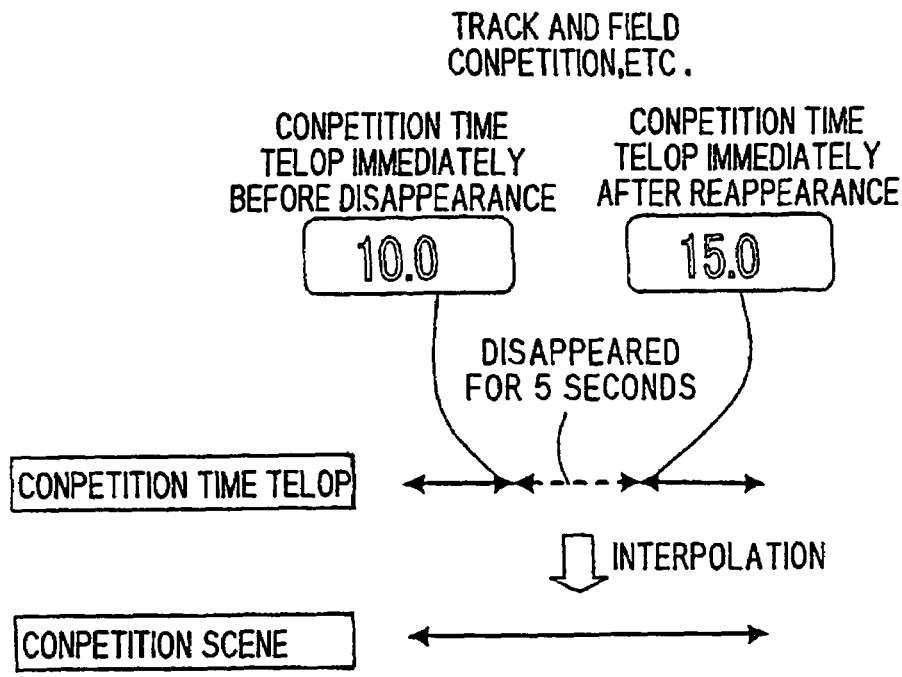
FIG. 14 is a drawing showing a detailed example of interpolation of a scene by the first scene processing unit.

In sport programs, there is a case in which the telop area is disappeared during the competition and is appeared again. In such a case, whether or not the segments before and after are the scene of the same competition may be determined by inspecting whether the time consistency is provided before the disappearance and after the reappearance of the telop area. For example, as shown in FIG. 14, assuming that the time immediately before the disappearance of the telop area is 10 seconds and the telop area is reappeared after 5 seconds, if the reappeared time is 15 seconds, it is determined that the same competition is continued from before the disappearance to after the reappearance of the telop area, so that the scene segment including the before and after frame segments in succession is determined as a real competition scene.

Figure 17:
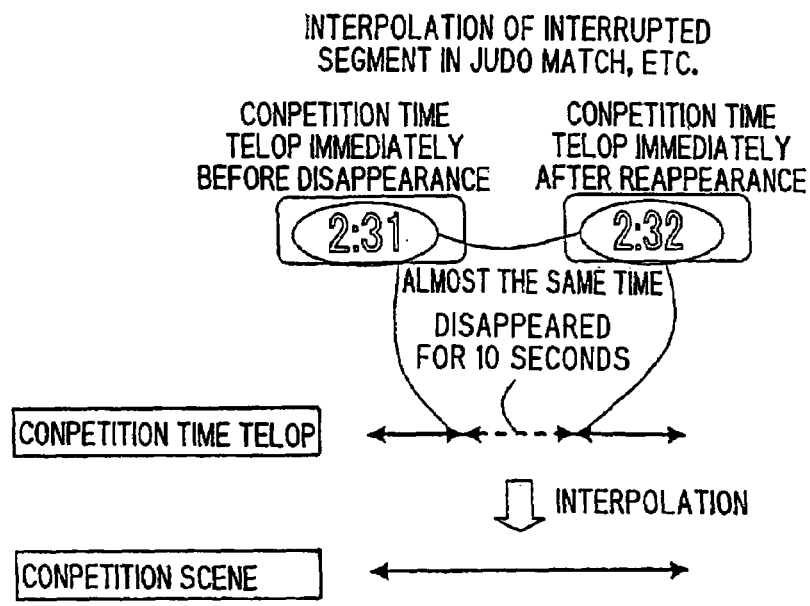
FIG. 17 is a drawing showing a detailed example of interpolation of a scene by the second scene processing unit.
Figure 18:
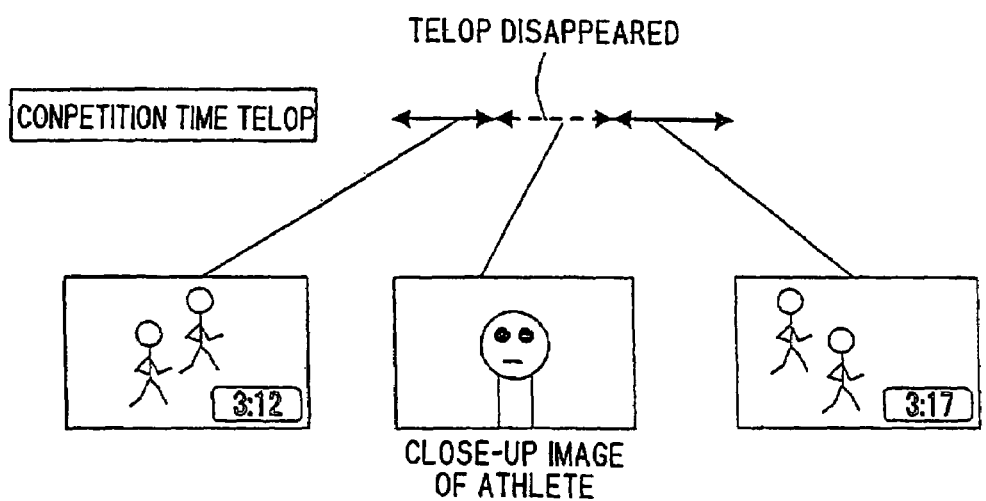
FIG. 18 is a drawing showing a detailed example in which the telop area is disappeared during the competition.

Also, in the case of the competition including the interrupted segment in the course of the competition like Judo matches, there is a case in which the telop area is disappeared during the interruption, and displayed again. In such a case as well, whether or not the frame segments before and after are the same competition scene may be determined by comparing the time displayed before the disappearance of the telop area and the time displayed after the reappearance of the telop area. Since the time does not change during the interrupted segment, the displayed time in the time display area before the disappearance and after the reappearance is little changed. For example, as shown in FIG. 17, assuming that the time immediately before the disappearance of the telop area is 2:31 seconds and the telop area is reappeared after 10 seconds, if the reappeared time is 2:32 seconds, it is determined that the same competition is continued from before the disappearance to after the reappearance of the telop area, so that the frame segment including the before and after segments in succession is determined as a real competition scene.

(12-2) Configuration of Scene Processing Unit 1102

The scene processing unit 1102 includes a first scene processing unit 1201 and a second scene processing unit 1202 as shown in FIG. 12.

The first scene processing unit 1201 compares whether the length of the input segment in which the telop area is disappeared and the progress of the displayed time in the time display areas before and after the disappearance are the same extent or not on the basis of the displayed time of the time display area included in the frames in the respective input segments for arbitrary two input segments. When it is determined that they are about the same extent, the first scene processing unit 1201 determines that the two input segments are included in a series of scenes and outputs the respective input segments as the output segment which is a continuous scene segment.

The second scene processing unit 1202 deal with a pair of input segments having continuous orders of the frame starting time in the video which are not processed by the first scene processing unit 1201. The second scene processing unit 1202 calculates the difference in displayed time in the time display areas before and after the disappearance on the basis of the displayed times in the time display areas included in the frames in the respective input segments before and after the input segment to be determined. When the difference is small, the second scene processing unit 1202 determines that the two input segments are included in a series of scene segments, and outputs the respective input segments as an output segment as a continuous scene segment.

(12-3) Configuration of First Scene Processing Unit 1201

The first scene processing unit 1201 includes a first segment selecting unit 1301, a frame selecting unit 1302, a real time difference calculating unit 1303, a displayed time difference calculating unit 1304, and a first continuity determining unit 1305.

The first segment selecting unit 1301 selects arbitrary two input segments from the plurality of input segments. In this case, the first segment selecting unit 1301 selects the two input segments having arbitrary frame time presents therebetween. In other words, the first segment selecting unit 1301 does not select the input segments having continued frame time.

The frame selecting unit 1302 selects one frame each from the two input segments.

The real time difference calculating unit 1303 calculates the difference in frame appearance time between the selected two frames as a real time difference.

The displayed time difference calculating unit 1304 calculates the difference in displayed time between the time display areas included respectively in these selected two frames as the displayed time difference.

When the difference between the real time difference and the displayed time difference is equal to or smaller than the threshold value, the first continuity determining unit 1305 determines that the pair of the input segments before and after are a series of scene segments.

(12-4) Configuration of Second Scene Processing Unit 1202

The second scene processing unit 1202 includes a second segment selecting unit 1601, a frame selecting unit 1602, a displayed time difference calculating unit 1603, and a second continuity determining unit 1604.

The second segment selecting unit 1601 selects two input segments having continuous order (sequence) of the frame start time in a video from between a pair of input segments which are not interpolated in the first scene processing unit 1201.

The frame selecting unit 1602 selects a final frame of the input segment having an earlier frame start time and an initial frame of the input segment having a later frame start time.

The displayed time difference calculating unit 1603 calculates the difference in displayed time between the time display areas included respectively in the selected two frames as a displayed time difference.

When the displayed time difference is equal to or smaller than the threshold value, the second continuity determining unit 1604 outputs the two input segments as the output segment which is a continuous scene segment. The second continuity determining unit 1604 sets the input segment interposed between the two input segments as an interrupted segment in the output segment.

(12-5) Operation of First Scene Processing Unit 1201

Subsequently, the operation of the first scene processing unit 1201 will be described.

The first scene processing unit 1201 carries out the process given below for all the pairs of input segments selected from the plurality of input segments.

The first segment selecting unit 1301 selects arbitrary two input segments from the plurality of input segments as a pair of input segments. At the time of selection, limiting conditions may be set for reducing the processing time and improving accuracy. For example, there is a method of selecting only pairs of two input segments which are close in terms of time sequence. It is also possible to select only two input segments having the continued orders of the start time.

Subsequently, the frame selecting unit 1302 selects one frame each from the selected two input segments. The frames may be selected from any part within the input segment.

Subsequently, the real time difference calculating unit 1303 outputs the difference of the frame appearance times of the selected two frames as the real time difference. The real time difference between the selected two frames may be obtained using a sampling rate of the video.

Subsequently, the displayed time difference calculating unit 1304 calculates the difference in displayed time between the time display areas included respectively in the selected two frames as the displayed time difference. The detailed description of the real time difference calculating unit 1304 will be given later.

Subsequently, the first continuity determining unit 1305 obtains the difference between the real time difference and the displayed time difference. When the difference is equal to or smaller than the threshold value, it is recognized that the time consistency of the input segments before and after is provided, and is determined to be a series of scene segments. For example, when the difference is equal to or smaller than one second, it may be determined as a series of scene segments.

Finally, the first continuity determining unit 1305 carries out a process to connect the series of scene segments and outputs the same as the output segment. Consequently, the start frame in the output segment is an initial frame in the input segment having an earlier frame appearance time and the final frame is the final frame in the input segment having a later frame appearance time.

(12-6) Displayed Time Difference Calculating Unit 1304

Subsequently, the displayed time difference calculating unit 1304 will be described in detail.

The displayed time difference calculating unit 1304 performs character recognition of the time display areas and obtains the time counts thereof, converts the same into a specific unit (such as 1:30 to 90 seconds), and then outputs the differences as the displayed time differences. The character recognition may be achieved by using the character recognition technology used in the related art.

Figure 15:
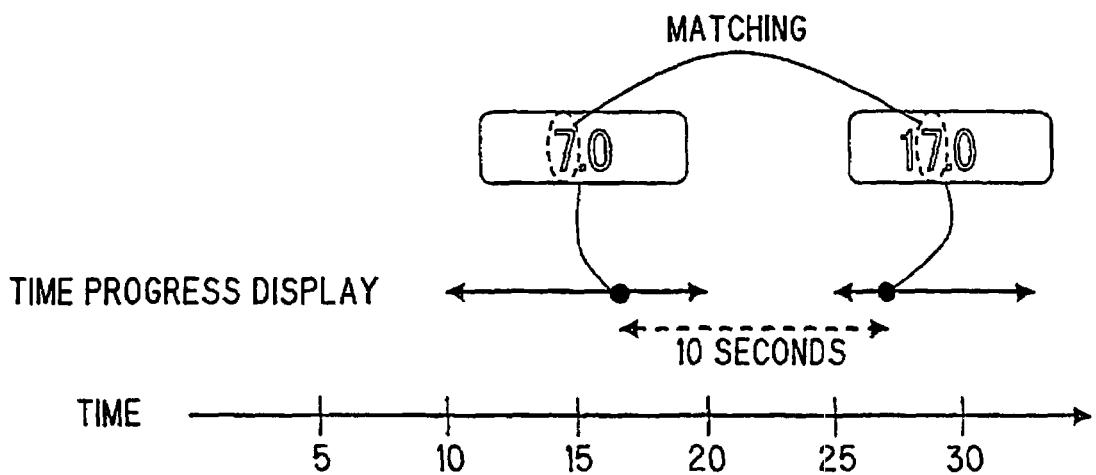
FIG. 15 is a drawing showing an example of determination of the segment conformity by the first scene processing unit.

Referring now to a detailed example shown in FIG. 15, a first method of determining the segment continuity without character recognition will be described.

In the first method, two frames having 10 seconds (or multiples thereof) difference in real time are selected first. Subsequently, matching on the basis of the similarity is carried out on the portions showing the seconds in the time display areas of the both frames, and when it is determined to be the same, the both frame segments are determined to display a series of scenes. The calculation of the similarity may be achieved by using the method described in a "second method of detecting the area change" in Step S404 in FIG. 4 or by using methods proposed in other documents. The portion showing the second in the time display area is obtained in advance as the area which is changed in a cycle of one second.

The respective units (minute, second, etc.) in the time display area has a feature such that the same numeric character appears cyclically. For example, like 3 seconds to 13 seconds (after 10 seconds) and from 13 seconds to 23 seconds (after 20 seconds), the same numeric character (3 in this example) appears at every 10 seconds in the portion displaying second. In the example shown in FIG. 15, the telop areas indicating 10 to 20 seconds, 25 to 33 seconds is monitored from the beginning of the program. The frame selecting unit 1302 selects the frames after 17 seconds and 27 seconds from the beginning of the program respectively. The portions showing the seconds in time display areas in the both frames are compared and, when they are matched, the frame segments before and after thereof are determined to be a series of scene segments.

There is a second method of determining the segment continuity without recognizing the time display area as the telops. In the second method, determination is made depending on whether or not the timings of the change in the time display areas are the same in the first segment of the frames before and after. For example, in the case of the time display area which is changed in a cycle of one second, sampling is carried out for 30 frames in a second and the respective frames are numbered from 0 to 29. If the time display area is changed at the 27th frame per second in the input segment before, and the time display area is changed at the 27th frame in the input segment after, the timings of change in the input segments before and after are the same, so that the both frame segments may be determined to be a series of competition scenes.

(12-7) Operation of Second Scene Processing Unit 1202

Subsequently, the operation of the second scene processing unit 1202 will be described.

The second scene processing unit 1202 carries out the following process on all the pairs of input segments having continuous order of the frame start time in a video from between the pair of input segments which are not interpolated in the first scene processing unit 1201.

First of all, the second segment selecting unit 1601 selects arbitrary two input segments having continuous order of the frame start time in a video from between the pair of input segments which are not interpolated in the first scene processing unit 1201.

The frame selecting unit 1602 selects a final frame of the input segment having an earlier frame start time and an initial frame of the input segment having a later frame start time in a video from the two input segments selected by the second segment selecting unit 1601.

The displayed time difference calculating unit 1603 calculates the difference in displayed time in the time display areas included respectively in the selected two frames as a displayed time difference. Since the operation of the displayed time difference calculating unit 1603 is the same as that of the displayed time difference calculating unit 1304 of the first scene processing unit 1201, detailed description will be omitted.

When the displayed time difference is equal to or smaller than the threshold value, the second continuity determining unit 1604 outputs the frame segment having processed to connect the two input segments as the output segments. The second continuity determining unit 1604 sets the frame segment interposed between the two input segments as an interrupted segment in the output segment. For example, when the difference is equal to or smaller than 3 seconds, it may be determined that the input segments before and after are a series of scene segments for processing.

Finally, the second continuity determining unit 1604 carries out a processing on the series of scene segments, and outputs the same as the output segment. Consequently, the start frame in the output segment is an initial frame in the input segment having an earlier frame appearance time, and the final frame is the final frame in the input segment having a later frame appearance time.

(12-8) Others

Determination of the competition scenes may be carried out by combining the method described above and CM data. In the case of a live broadcasting program, even when there is provided the time consistency before and after the disappearance of the telop area, there is a case in which a commercial message (CM) is interposed therebetween. Therefore, by using the CM data, a process of determining the frame segments in which the telop area is disappeared not to be the competition scenes if they include a commercial message is effective. The CM data may be generated using a CM detection technology used in the related art. For example, the method disclosed in JP-A-2006-324770 may be used.

As other methods of determining the competition scenes, when the duration in which the telop area is disappeared is short (for example, on the order of 10 seconds), it may be determined as the competition scene. Since a certain time duration exists from when one competition is finished until when the next competition starts in many cases, such method is also effective.

Among the input segments which are not processed by the first scene processing unit 1201, those including only a short duration in which the telop area is disappeared may be determined as the competition interrupted segments.

(12-9) Setting of Important Segments

The output segments including a frame segment which is processed by the first scene processing unit 1201 may be set as an important segment. This will be described using FIG. 18. For example, in the case of a program using an international video such as Olympic game, since the competition time telop is superimposed on the international video, the competition time telop is basically included during the competition. However, in the competition in which a notable athlete such as a home country's athlete is participating, an own close-up video of the notable athlete is inserted in the midway of the competition, and hence the competition time telop is disappeared temporarily. Using this feature, the competition scene from which the competition time telop is disappeared during the competition may be recognized as an important competition.

Also, the feature as described above may be used for selecting thumbnail images. In the input segments where the competition time telop is disappeared, the close-up image of the athlete is included in many cases. Therefore, the thumbnail images are selected from the corresponding input segments and uses as a representative image which represents the competition scene. When the initial image of the competition is simply selected as the thumbnail image, similar images are selected for all the competitions. However, by using this method, understanding of the participated athlete is enabled from the representative image.

It may also be combined with face detection for use. By detecting the face during the input segment in which the competition time telop is disappeared, and using the frame from which the face is detected as the thumbnail image, the thumbnail image may be selected with high degree of accuracy.

(13) Removing Unit 1103

Figure 19:
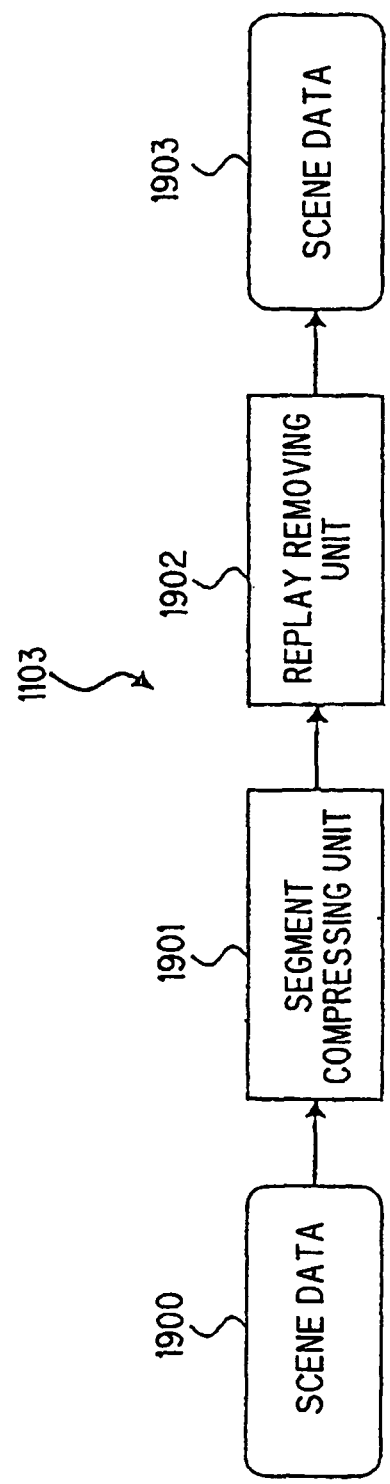
FIG. 19 is a block diagram showing a removing unit in FIG. 11.

Referring now to FIG. 19, the removing unit 1103 of the scene data calculating unit 103 will be described. FIG. 19 is a block diagram showing the detailed configuration of the removing unit 1103.

Figure 21:
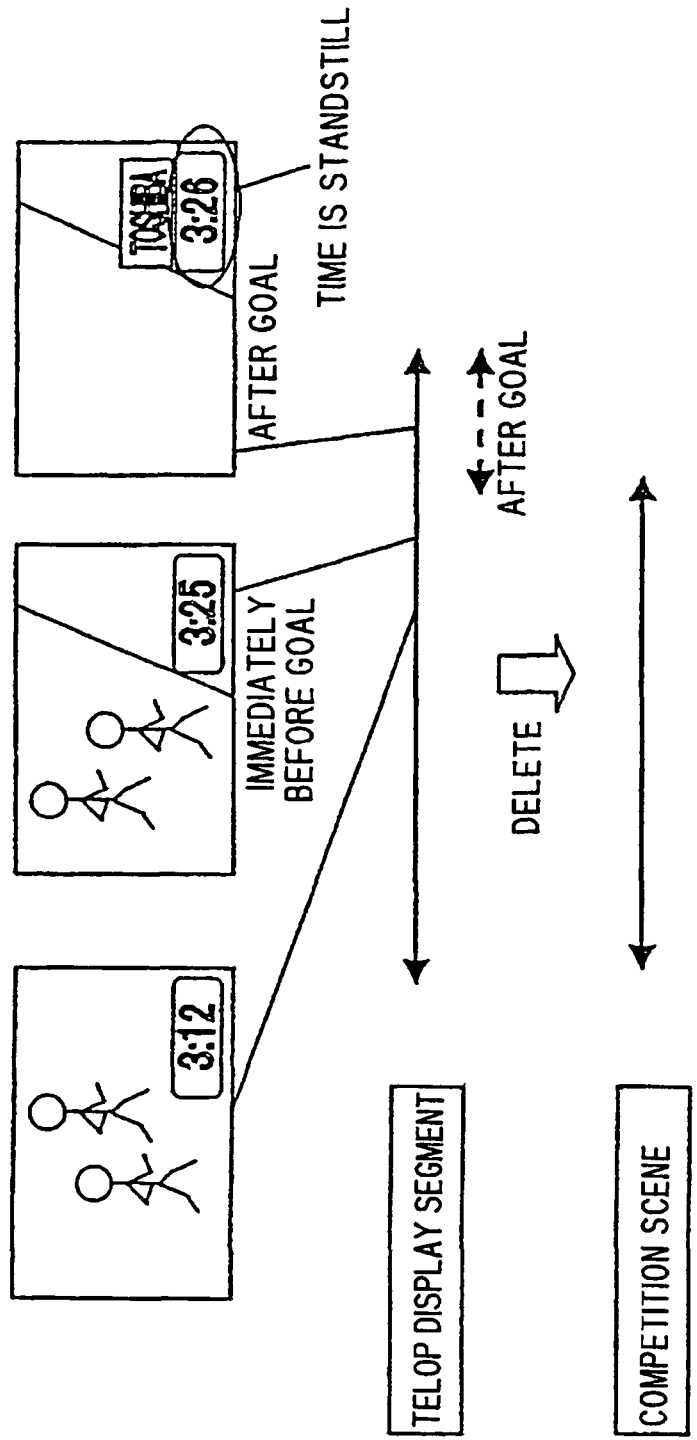
FIG. 21 is a drawing showing a detailed example of removal of a segment out of the scene by a segment compressing unit.

The telop area might be displayed slightly before the start of the competition, and might be displayed for a while after having finished the competition as shown in FIG. 21. As a method of detecting such a segment, there is a method of using whether or not the time display area is changed. While the time in the time display area is changed during the competition, it stops before the start of the competition and after having finished the same. Therefore, the removing unit 1103 is able to remove the unnecessary input segments by obtaining the input segments in which the time display area is not changed.

Also, in the competitions for competing the time such as track and field competitions or swimming races, the goal time differs from competition to competition. Using this feature, the frame segment of replay may be detected as in the example in FIG. 23. For example, even in the case of the same 1000 meters race, the same goal time rarely occurs among the difference races such that the goal time in the first race is 3:26, and that in the second race is 3:31. In contrast, the replay scene demonstrates the same time as the original video. Therefore, the races having the same goal time is detected as the replay scene and the corresponding input segment is removed.

The removing unit 1103 includes a segment compressing unit 1901 and a replay removing unit 1902.

The segment compressing unit 1901 detects a still segment in which the time display area is not changed in the input segment. The segment compressing unit 1901 removes the sill segment which includes one of the initial frame and the final frame of the input segment as the unnecessary segment. The segment compressing unit 1901 outputs the remaining input segments as the output segments.

The replay removing unit 1902 determines the conformity of the arbitrary two input segments on the basis of the similarity of the frames. When the conformity is proved, the replay removing unit 1902 determines that the input segment whose frames appear later is a replay scene of the input segment whose frames appear earlier, and outputs the input segments having removed the input segment of the replay scene as the output segment.

The block diagram in FIG. 19 is illustrative only, and all the processing units 1901 to 1902 of the removing unit 1103 are not necessarily essential, and may be included partly or in the different order.

(13-1) Segment Compressing Unit 1901

Figure 20:
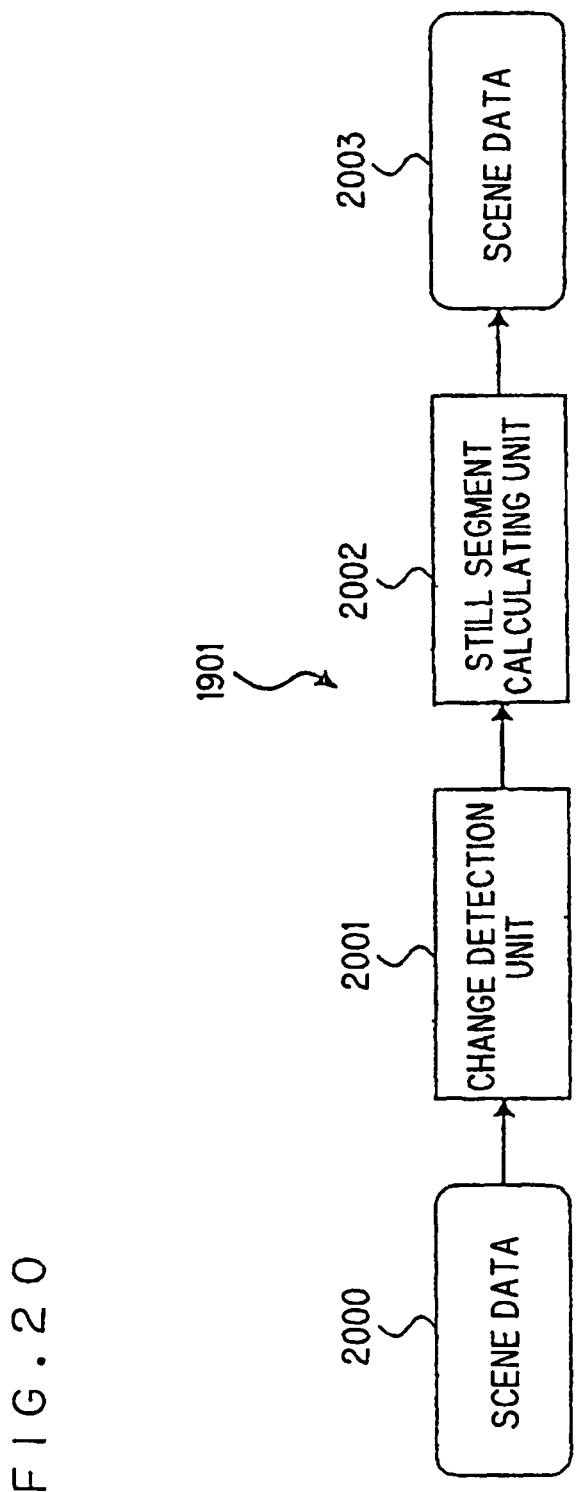
FIG. 20 is a block diagram showing a segment compressing unit in FIG. 19.

Referring now to FIG. 20, the segment compressing unit 1901 in FIG. 19 will be described. FIG. 20 is a block diagram showing the detailed configuration of the segment compressing unit 1901.

The segment compressing unit 1901 includes a change detection unit 2001 and a still segment calculating unit 2002.

The change detection unit 2001 determines the presence or absence of change in the time display area on the basis of the presence and absence of the change in the respective cyclically changing areas which constitute the time display area.

The still segment calculating unit 2002 outputs the segments in which the ratio of change in the time display area is remarkably lower than the cycle of change as a still segment.

The operation of the segment compressing unit 1901 in FIG. 19 will now be described.

The segment compressing unit 1901 carries out the process given below for all the detected input segments.

First of all, the change detection unit 2001 determines the presence or absence of change in the time display area on the basis of the presence and absence of the change in the respective cyclically changing areas which constitute the time display area.

When the time display area includes only the cyclically changing areas in the same cycle, the presence or absence of the change is determined for all the cyclically changing areas which constitute the time display area. As the method of determining the presence and absence of the change, a method described in the "second method of detecting the area change" in Step S404 in FIG. 4 may be used.

When the time display area includes cyclically changing areas having a plurality of cycles, the presence or absence of the change is determined for the cyclically changing area having the shortest cycle therefrom. As a method of determining the presence and absence of the change, a method described in the "second method of detecting the area change" in Step 404 in FIG. 4 may be used.

The still segment calculating unit 2002 outputs the segments in which the ratio of change with respect to the displayed time of the time display area is remarkably lower than the cycle of change as a still segment in which the time display area is not changed.

First of all, respective adjacent frames of n frames before and after the noted frame are compared, and the presence or absence of the change in the time display area is detected by applying threshold processing on "the changed pixels/all the pixels included in the cyclically changing area".

Then, the "number of times of change in the time display areas in the n frames before and after the noted frame/2n" is obtained as the ratio of change with respect to time of time display area. As the threshold value for obtaining the still segment, a numeric value C×R, which is obtained by multiplying the cycle of change C by a constant ratio R, is used. The segments in which the ratio of change in the time display area is lower than C×R are determined as the still segments.

Finally, the still segment including the initial frame or the final frame in the input segment is removed as the unnecessary segment, and the remaining input segments are outputted as the output segments.

(13-2) Replay Removing Unit 1902

Figure 22:
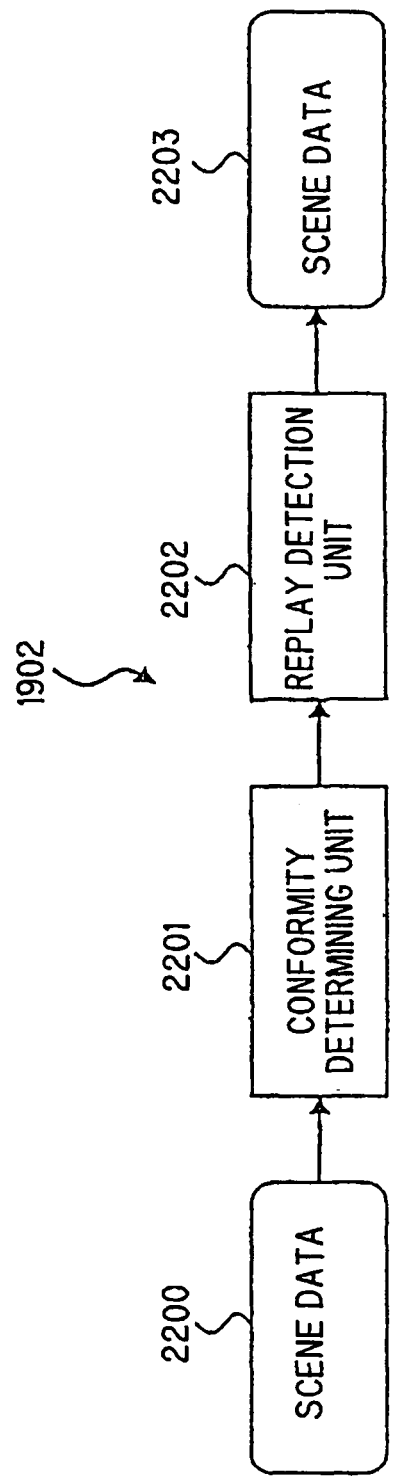
FIG. 22 is a block diagram of a replay removing unit in FIG. 19.
Figure 23:
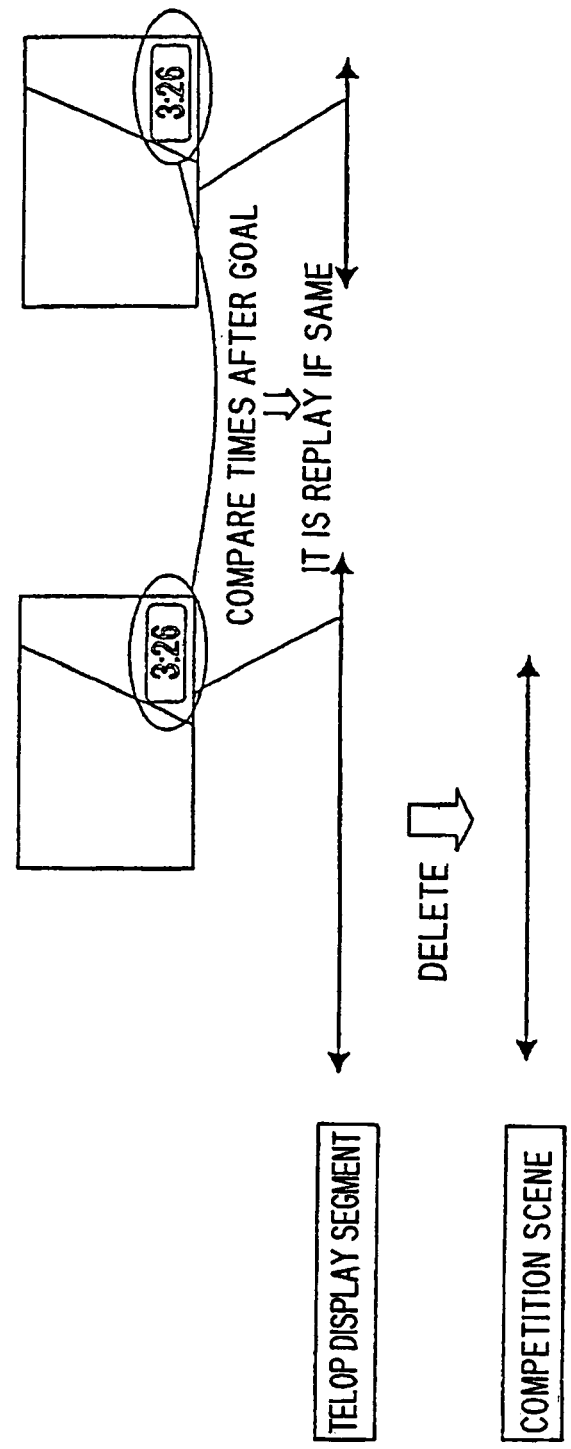
FIG. 23 is a drawing showing a detailed example of removal of a segment out of the scene by the replay removing unit.

Referring now to FIG. 22, the replay removing unit 1902 in FIG. 19 will be described. FIG. 22 is a block diagram showing the detailed configuration of the replay removing unit 1902.

The replay removing unit 1902 includes a conformity determining unit 2201 and a replay detection unit 2202.

The conformity determining unit 2201 compares the entire or part of the frames immediately before the ends of the arbitrary two input segments and determines the conformity on the basis of the similarity of the frames.

When the final frames are determined to be the same, the replay detection unit 2202 determines that the scene whose telop area appears later in the video is a replay of the scene whose telop area appears earlier.

The operation of the replay removing unit 1902 in FIG. 19 will now be described.

The replay removing unit 1902 carries out the process given below for all the pairs of input segments.

First of all, the conformity determining unit 2201 compares the entire or part of the frames immediately before the ends of the two input segments, and determines the conformity on the basis of the similarity of the frames as the threshold value. The similarity of the entire screens or the similarity of the time display areas in the video is determined. The calculation of the similarity may be obtained using an image comparison technology used in the related art.

When the two input segments are determined as the same, the replay detection unit 2202 outputs the input segment whose frames appear later as a replay scene of the input segment whose frames appear earlier.

Finally, the input segment determined as the replay scene is removed, and the remaining input segments are outputted as the output segments.

(14) Labeling Unit 1104

Figure 24:
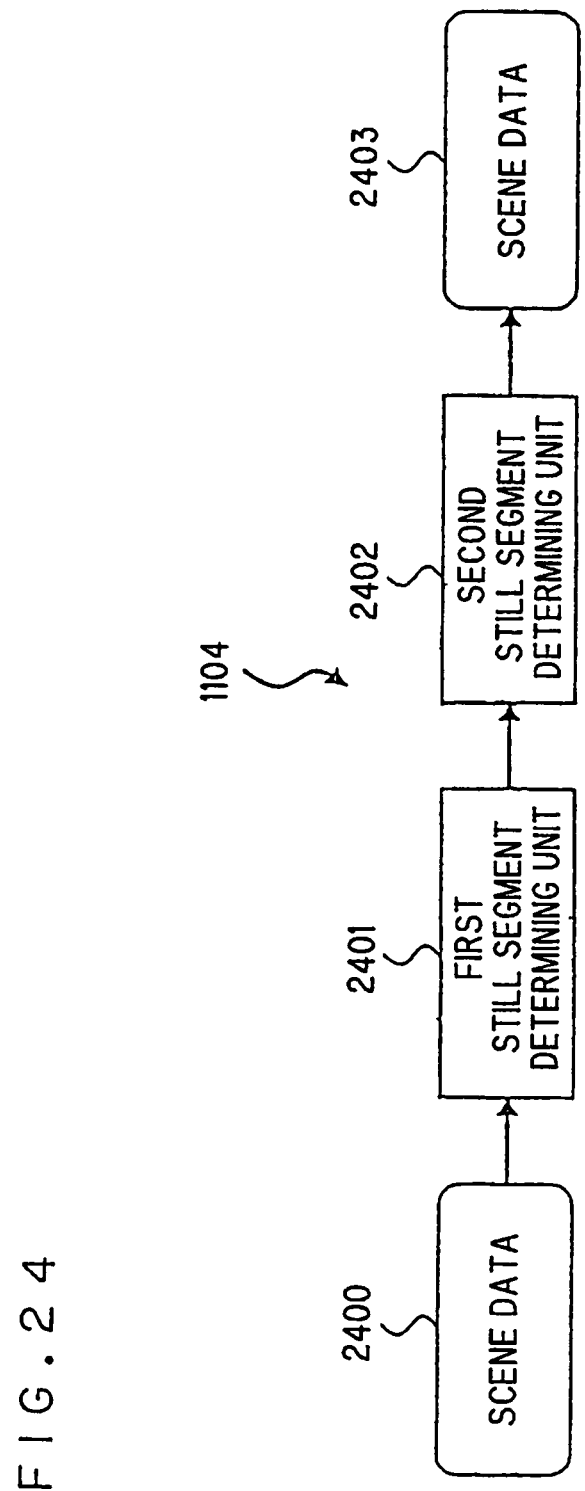
FIG. 24 is a block diagram showing a labeling unit in FIG. 11.

Referring now to FIG. 24, the labeling unit 1104 of the scene data calculating unit 103 will be described. FIG. 24 is a block diagram showing the detailed configuration of the labeling unit 1104.

The labeling unit 1104 includes a first still segment determining unit 2401 and a second still segment determining unit 2402.

The first still segment determining unit 2401 compares whether or not the length of the input segment in which the time display area is stand still and the progress of the displayed time in the time display area before and after being standstill are the same extent for the still segment interposed between the non-still segments in the input segments, and when it is determined that they are the same extent, the corresponding still segment is determined to be the important segment.

When the difference in displayed time between the time display areas before and after the still segment on the basis of the displayed times in the time display areas included in the frames in the respective input segments before and after the still segment which is not determined as the important segment by the first still segment determining unit 2401 is small, the second still segment determining unit 2402 determines the corresponding still segment to be an interrupted segment.

The block diagram in FIG. 24 is illustrative only, and all the processing units 2401 to 2402 of the labeling unit 1104 are not necessarily essential, and may be included partly or in the different order.

(14-1) First Still Segment Determining Unit 2401

Figure 13:
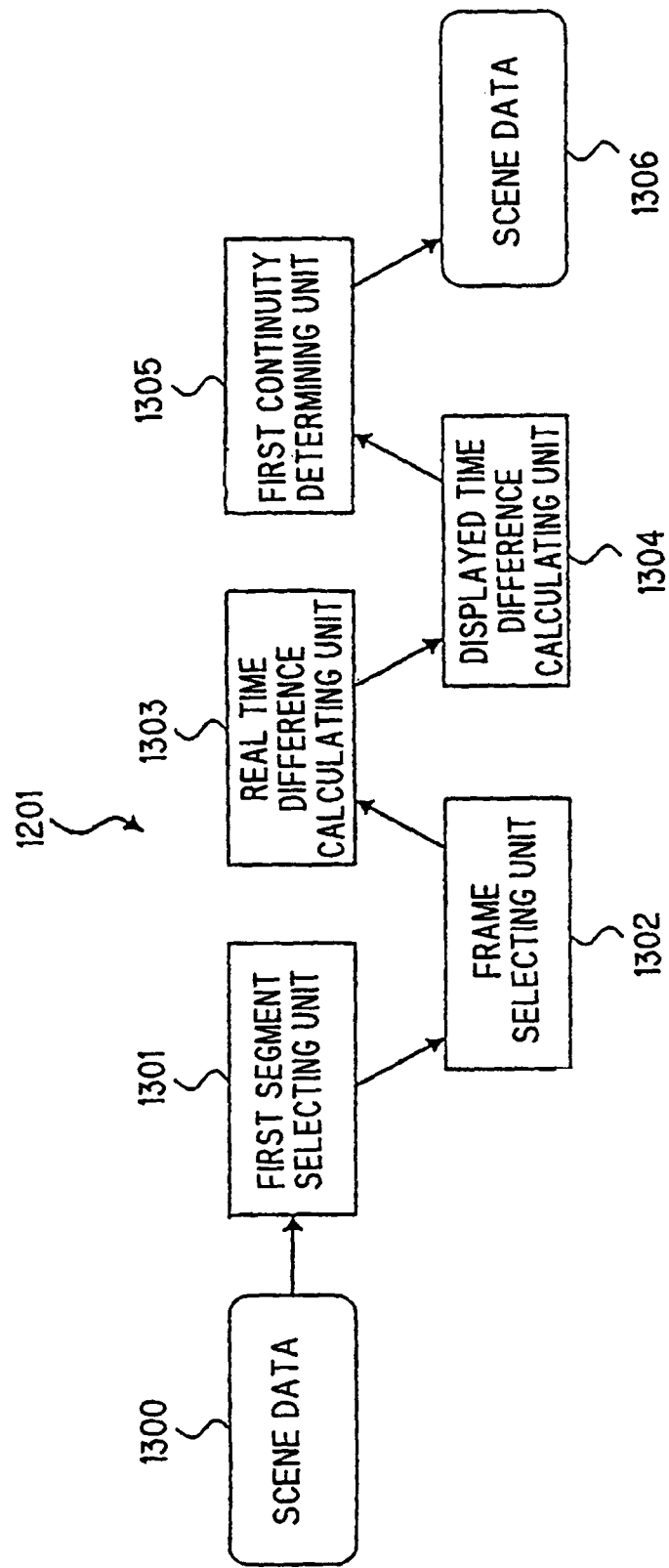
FIG. 13 is a block diagram showing a first scene processing unit in FIG. 12.

Since the first still segment determining unit 2401 has almost the same structure as the first scene processing unit 1201 in FIG. 13, illustration is omitted. In other words, the first still segment determining unit 2401 includes the frame selecting unit 1302, the real time difference calculating unit 1303, the displayed time difference calculating unit 1304, and the first continuity determining unit 1305.

The frame selecting unit 1302 selects one frame each from the input segments before and after the still segment interposed between the non-still segments in the input segment.

The real time difference calculating unit 1303 calculates the difference in frame appearance times between the selected two frames as a real time difference.

The displayed time difference calculating unit 1304 calculates the difference in displayed time between the time display areas included respectively in the selected two frames as the displayed time difference.

When the difference between the real time difference and the displayed time difference is equal to or smaller than the threshold value, the first continuity determining unit 1305 determines that the still segment is an important segment.

(14-2) Second Still Segment Determining Unit 2402

Figure 16:
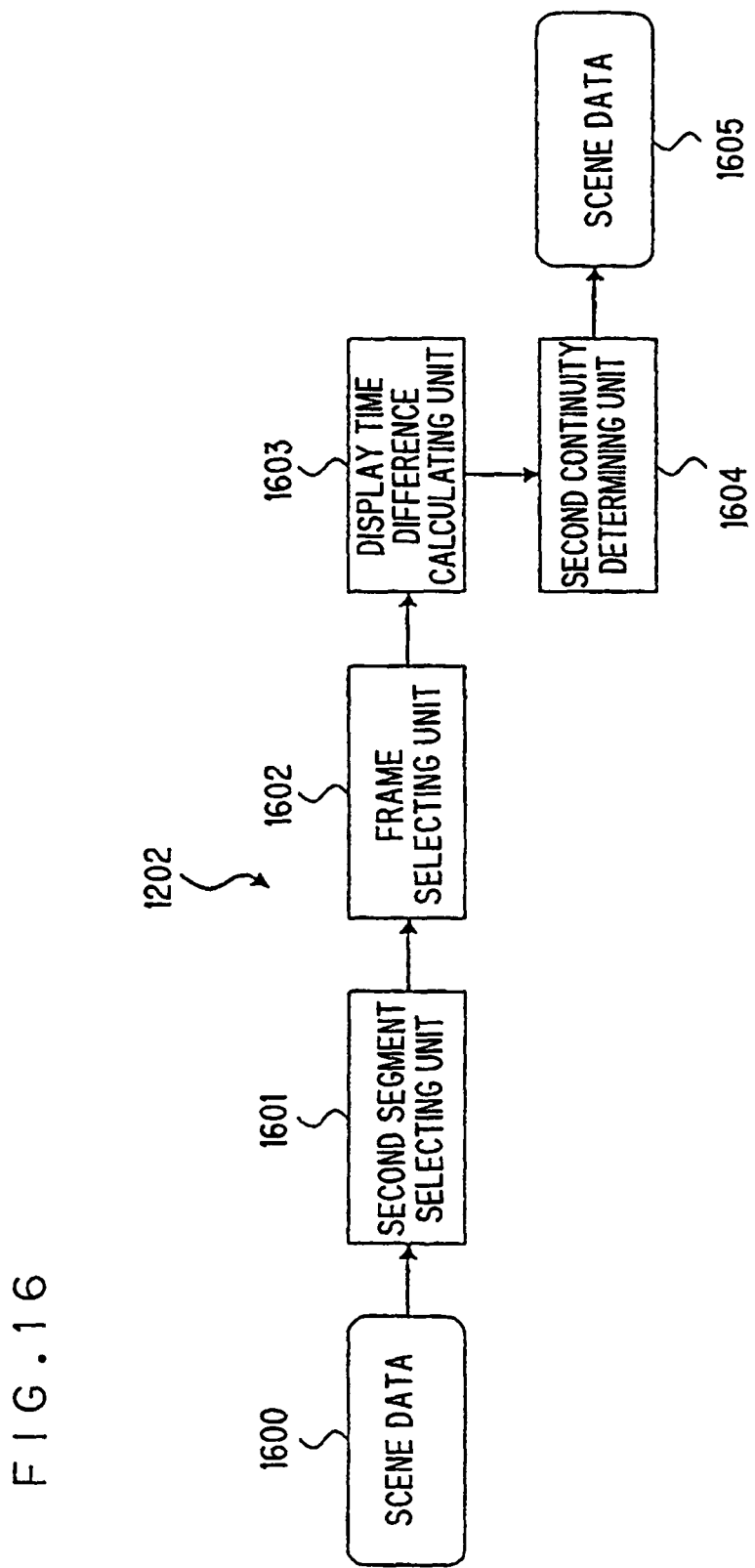
FIG. 16 is a block diagram showing a second scene processing unit in FIG. 12.

Since the second still segment determining unit 2402 has almost the same structure as the second scene processing unit 1202 in FIG. 16, illustration is omitted. The second still segment determining unit 2402 includes the frame selecting unit 1602, the displayed time difference calculating unit 1603, and the second continuity determining unit 1604.

The frame selecting unit 1602 selects two frames in total of the final frame of the still segment, which is not determined as the important segment by the first still segment determining unit 2401 and the initial frame of the non-still segment immediately after the still segment.

The displayed time difference calculating unit 1603 calculates the difference in displayed time in the time display areas included respectively in the selected two frames as a displayed time difference.

When the difference in displayed time is equal to or smaller than the threshold value, second continuity determining unit 1604 determines that the still segment is an interrupted segment.

(14-3) Advantages

The effects of the labeling unit 1104 will be described.

Figure 25A:
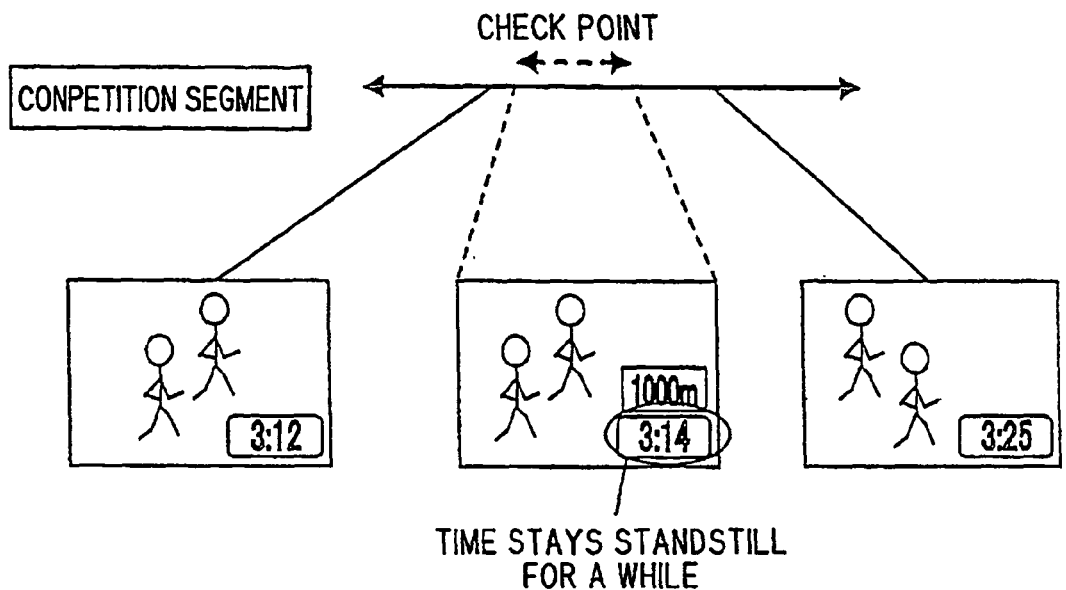
FIG. 25A is a drawing showing an example in which the time count is stopped at a check point in the game of track and field competition.

The time count might be stopped once at a check point during the track and field competition and at the interruption of the match during Judo matches or the like. For example, as shown in FIG. 25A, during the track and field competition, the passing time is displayed when passing at a point of 1000 m, and the time count is stopped for a while. In such a case, whether or not it is the check point may be determined by providing the consistency of the change in displayed time between the segments before and after the time being standstill and the segment where the time is standstill.

Figure 25B:
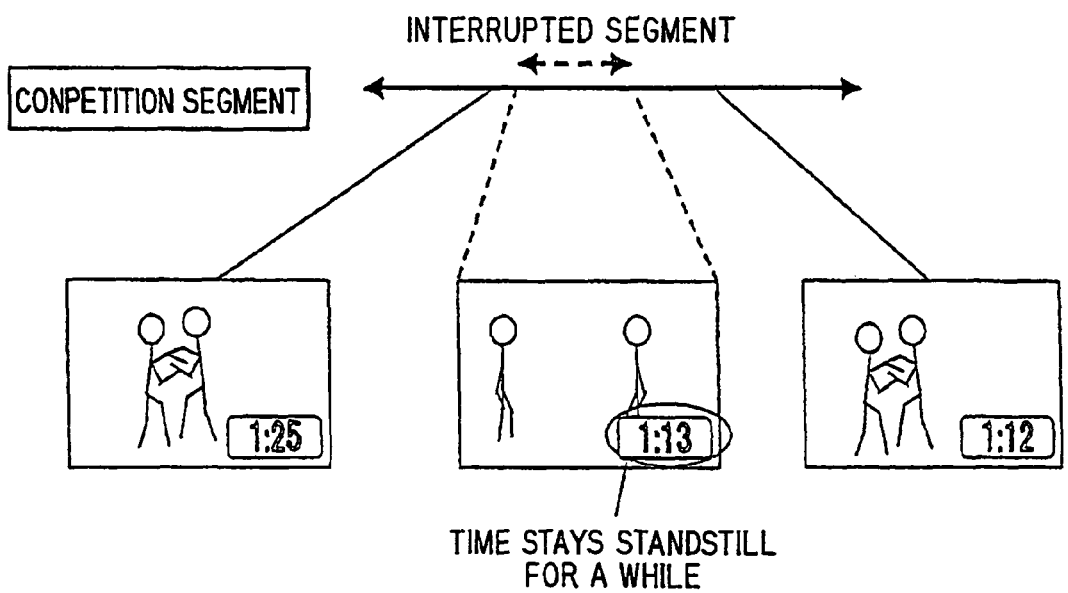
FIG. 25B is a drawing showing an example in which the time count is stopped during an interrupted segment in Judo match.

In Judo matches, as shown in FIG. 25B, when the competition of Judo match is interrupted, and the time count is stopped for a while. In such a case, since the displayed time is little changed in the segments before and after the time being standstill, whether or not it is the interrupted segment is determined by comparing the times of the segments before and after the still segment.

(14-4) Other Methods

As other methods of determining the interrupted segment, the input segment which is not determined as the important segment by the first still segment determining unit 2401 from the still segments on the time display areas interposed between the non-still segments before and after thereof may be determined as the interrupted segment.

There is another method of determining whether the still segment is the check point or the interrupted segment. For example, in the track and field competition, the time count is stopped once at the check points such as 100 m or 200 m. At this time, the telop which indicates the distance of the check point is displayed in the periphery of the telop area as shown in FIG. 25A in many cases. Therefore, whether or not the telop is appeared immediately after the time count is stopped is detected using a general method of extracting the telop and, the corresponding point is determined as the check point if the telop is found, and as the interrupted segment if it is not found.

It is also possible to use data on genre of the sports and determine the still segment as the check point in the competition programs such as the track and field competitions or swimming races, and determine the still segment as the interrupted segment in Judo matches or American football matches.

(15) Method of Using Video Processing Apparatus

The video processing apparatus may be used as follows using data on the real competition scene obtained as described above.

Figure 27:
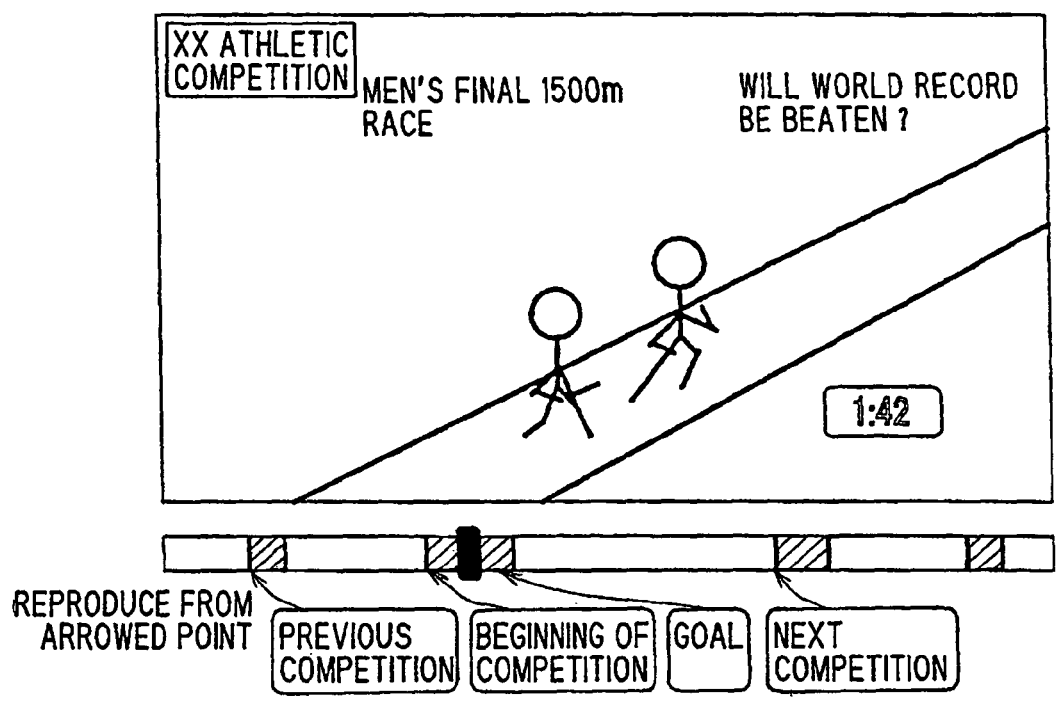
FIG. 27 is a drawing showing an example of a method of reproducing a sport video using data of the real competition scenes.

FIG. 27 shows an example of watching method of the sport program. When a button "previous competition" is pressed, the scene is jumped from the watching position to the initial frame of the previous competition. When a button "beginning of the competition" is pressed, the scene is jumped to the beginning of the competition only when the watching position is in the course of the competition. When a button "goal" is pressed, the scene is jumped to a point immediately before the final frame of the competition only when the watching position is in the course of the competition. Users are able to watch the program efficiently using such interfaces.

Since many interrupted segments are included during the competition in Judo matches or the like, the competition scenes with the interrupted segment excluded are produced as a digest video.

Alternatively, the video processing apparatus is used for providing chapters at the detected check points or for producing the digest video including the check points. Since the replay scenes are already edited as highlight scenes in many cases, the input segments of the replay scenes may be reproduced as the highlight scenes as is. When a plurality of replay scenes are present in the same competition, only one of those may simply be reproduced.

According to the video processing apparatus according to the embodiment described above, a video may be divided into adequate scene segments by detecting the cyclicity of the change in the extracted telop areas, detecting the areas in which part of the telop changes cyclically as the telop areas, and estimating the frame segments whose telop area is disappeared during the competition or whose telop area is displayed for a while even after the competition has ended.

(16) Method of Realizing Video Processing Apparatus

The instructions indicated in the procedure of processing in the video processing apparatus may be executed on the basis of the program as software. The multipurpose calculator system may achieve the same advantages as those achieved by the video processing apparatus in the embodiment described above by recording this program in advance and reading the program. The instructions described in the embodiment shown above are stored in magnetic disks (flexible disks, hard disks, etc.), optical disks (CD-ROM, CD-R, CD-RW, DVD-ROM, DVD±R, DVD±RW, etc.), semiconductor memories, and equivalent recording mediums as the program which may be executed by computers. The recording format may be of any type as long as it is a recording medium which the computer or integrated system can read. The computer reads the program from the recording medium, and causes a CPU to execute the instruction described in the program on the basis of the program, so that the similar actions to the video processing apparatus in the embodiment described are achieved. When the computer acquires or reads the program, it may acquire or read via a network. Alternatively, part of the respective processes for realizing the embodiment may be executed by OS (operating system), database management software, or MW (middle ware) such as the network running on the computer on the basis of the instructions of the program installed in the computer or the integrated system from the recording medium.

The recording medium in the invention of the present application is not limited to the medium independent from the computer or the integrated system, but the recording medium in which the program transferred via LAN or internet is downloaded and recorded or temporarily recorded is also included.

The recording medium is not limited to one, but a case in which the process in this embodiment is executed from a plurality of media is also included in the recording medium in the invention, and the medium may have any configuration.

The computer or the integrated system in the invention of the present application is for executing the respective processes in this embodiment on the basis of the program recorded in the recording medium, and may be of any configuration such as an apparatus including a single personal computer or microcomputer, or a system in which a plurality of apparatuses are connected via network.

The computer according to the embodiment of the invention of the present application is not limited to the personal computer, but includes an arithmetic processing unit included in information processing equipment and a microcomputer or the like, and represents equipments and apparatus which are able to realize functions in the embodiment of the invention.

The invention of the present application is not limited to the embodiments shown above as is, and components may be modified and embodied without departing from the scope of the invention in the stage of implementation. Various modes of the invention are achieved by combining the plurality of components disclosed in the embodiments described above as needed. For example, several components may be eliminated from all the components shown in the embodiment. In addition, the components in different embodiments may be combined as needed.

What is claimed is:

1. A video processing apparatus comprising:
a memory; and
a processing system configured to execute instructions stored in the memory to perform operations comprising:

receiving video including a plurality of frames;

detecting competition time telop areas that include a cyclically changing area which changes cyclically at arbitrary intervals in respective frame segments in the video and detecting time display areas from the detected competition time telop areas;

setting a plurality of frame segments having competition time telop areas that include a cyclically changing area in common to one another as input segments and selecting two of the input segments from the plurality of input segments;

calculating respective displayed times of the two input segments on the basis of time display areas in the two input segments; and determining whether or not the two input segments are a series of scene segments on the basis of the displayed times of the two input segments and outputting two input segments determined to be a series of scene segments as an output segment, which is a scene segment including the two input segments combined with each other.

2. The apparatus according to claim 1, wherein the processing system is configured to execute instructions stored in the memory to perform further operations comprising selecting two input segments whose frame start times are continued in sequence from the plurality of input segments.

3. The apparatus according to claim 1, wherein the processing system is configured to execute instructions stored in the memory to perform further operations comprising:

selecting one each of frames from between the two selected input segments;

calculating the difference between the frame appearance times of the two frames as a first real time difference;

calculating the difference between the displayed times of the time display areas of the two frames as a first displayed time difference; and determining that the two input segments are a series of scene segments when the difference between the first real time difference and the first displayed time difference is equal to or smaller than a first threshold value.

4. The apparatus according to claim 3, wherein the processing system is configured to execute instructions stored in the memory to perform further operations comprising:

selecting a final frame of the input segment whose frame start time is earlier and an initial frame of the input segment whose frame start time is later from the two input segments which are not determined to be a series of scene segments;

calculating the difference between the displayed times of the two frames as a second displayed time difference; and determining the two input segments are a series of scene segments when the second displayed time difference is equal to or smaller than a second threshold value and setting the input segment interposed between the two input segments as an interrupted segment of the output segment.

5. The apparatus according to claim 1, wherein the processing system is configured to execute instructions stored in the memory to perform further operations comprising setting the output segment as an important segment.

6. The apparatus according to claim 1, wherein the processing system is configured to execute instructions stored in the memory to perform further operations comprising selecting a thumbnail image from a frame in the output segment, wherein the thumbnail image selecting selects a frame in the scene segment in the output segment where the time display area does not appear on a priority basis.

7. The apparatus according to claim 1, wherein the processing system is configured to execute instructions stored in the memory to perform further operations comprising setting an input segment whose cyclical change of the time display area is lower than an arbitrary change cycle as a still segment, removing the still segment included in one of the initial frame or the final frame of the input segment from the input segments, and outputting the remaining input segments as the output segment.

8. The apparatus according to claim 1, wherein the processing system is configured to execute instructions stored in the memory to perform further operations comprising comparing frames immediately before the ends of the two input segments and obtaining a similarity, determining the conformity of the respective frames on the basis of the similarity, if the respective frames are determined to be the same, determining the input segment whose frame appearance time in the telop area is later to be a replay scene of the input segment whose frame appearance time is earlier, and outputting the input segments from which the input segment determined as the replay scene is removed as the output segment.

9. The apparatus according to claim 1, wherein the processing system is configured to execute instructions stored in the memory to perform further operations comprising:

setting an input segment whose cyclical change of the time display area is lower than an arbitrary change cycle as a still segment and selecting one frame each from the input segments in a non-still state interposing the still image from before and after;

calculating the difference between the frame appearance times of the two frames as a first real time difference;

calculating the difference between the displayed times of the two frames as a first displayed time difference;

determining the still segment as an important segment when the difference between the first real time difference and the first displayed time difference is equal to or smaller than a first threshold value.

10. The apparatus according to claim 9, wherein the processing system is configured to execute instructions stored in the memory to perform further operations comprising:

calculating the difference in displayed time between the final frame of the still segment which is not determined as the important segment and the initial frame in the input segment in the non-still state immediately after the still segment as a second displayed time difference; and determining the still segment as an interrupted segment when the second displayed time difference is equal to or smaller than a second threshold value.

11. The apparatus according to claim 4, wherein the processing system is configured to execute instructions stored in the memory to perform further operations comprising creating a digest video from the output segment from which the interrupted segment is removed.

12. The apparatus according to claim 10, wherein the processing system is configured to execute instructions stored in the memory to perform further operations comprising creating a digest video from the output segment from which the interrupted segment is removed.

13. A video processing method comprising:

receiving video including a plurality of frames;

detecting competition time telop areas that include a cyclically changing area which changes cyclically at arbitrary intervals in respective frame segments in the video and detecting time display areas from the detected competition time telop areas;

setting a plurality of frame segments having competition time telop areas that include a cyclically changing area common to one another as input segments and selecting two of the input segments from the plurality of input segments;

calculating respective displayed times of the two input segments on the basis of time display areas in the two input segments; and determining whether or not the two input segments are a series of scene segments on the basis of the displayed times of the two input segments and outputting two input segments determined to be a series of scene segments as an output segment, which is a scene segment including the two input segments combined with each other.

14. A video processing program stored in a non-transitory computer readable medium, the program, when executed, causing a computer to perform operations comprising:

receiving video including a plurality of frames;

detecting competition time telop areas that include a cyclically changing area which changes cyclically at arbitrary intervals in respective frame segments in the video and detecting time display areas from the detected competition time telop areas;

setting a plurality of frame segments having competition time telop areas that include a cyclically changing area common to one another as input segments and selecting arbitrary two of the input segments from the plurality of input segments;

calculating respective displayed times of the two input segments on the basis of time display areas in the two input segments;

determining whether or not the two input segments are a series of scene segments on the basis of the displayed times of the two input segments and outputting two input segments determined to be a series of scene segments as an output segment, which is a scene segment including the two input segments combined with each other.

* * * * *